United States Patent [19]

Kret

[11] Patent Number: 4,751,635
[45] Date of Patent: Jun. 14, 1988

[54] DISTRIBUTED MANAGEMENT SUPPORT SYSTEM FOR SOFTWARE MANAGERS

[75] Inventor: Michael A. Kret, Pisacataway Township, Middlesex County, N.J.

[73] Assignee: Bell Communications Research, Inc., Livingston, N.J.

[21] Appl. No.: 852,622

[22] Filed: Apr. 16, 1986

[51] Int. Cl.⁴ ............................................. G06F 15/16
[52] U.S. Cl. .................................................. 364/200
[58] Field of Search ........................ 364/200 MS File

[56]  References Cited

U.S. PATENT DOCUMENTS

| | | | |
|---|---|---|---|
| 4,145,739 | 3/1979 | Dunning et al. | 364/200 |
| 4,509,121 | 4/1985 | Rey et al. | 364/200 |
| 4,514,806 | 4/1985 | Hartig | 364/200 |

*Primary Examiner*—Raulfe B. Zache
*Attorney, Agent, or Firm*—James W. Falk; John T. Peoples

[57] ABSTRACT

A management system utilizes a distributed network having a host computer connected to one or more computer based workstations. Separate, on-line softward support systems provide the execution environment for the system. Each support system provides data that reflects one or more aspects of a life cycle of a development project. This data is stored in separate databases associated with each support system. Periodically, the host computer extracts information from each of these support system databases to obtain data indicative of development activity for various phases of the life cycle of the software system. The extracted information is used to update a relational database. At any time, a manager situated at a workstation can formulate queries into the relational database. Thereafter, the workstation, through a workstation/host communications interface, initiates a host session and then loads the queries into the host computer. The host, in turn, executes these queries and downloads the query results into the workstation. Then the manager appropriately analyzes and interprets those query results at the workstation. The communications interface ensures that the host session remains substantially transparent to the manager. This advantageously frees the manager of any need to learn the host logon procedure and operating system, thereby minimizing the managerial time and effort required to obtain the desired information.

15 Claims, 26 Drawing Sheets

FIG. 7
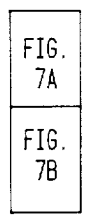
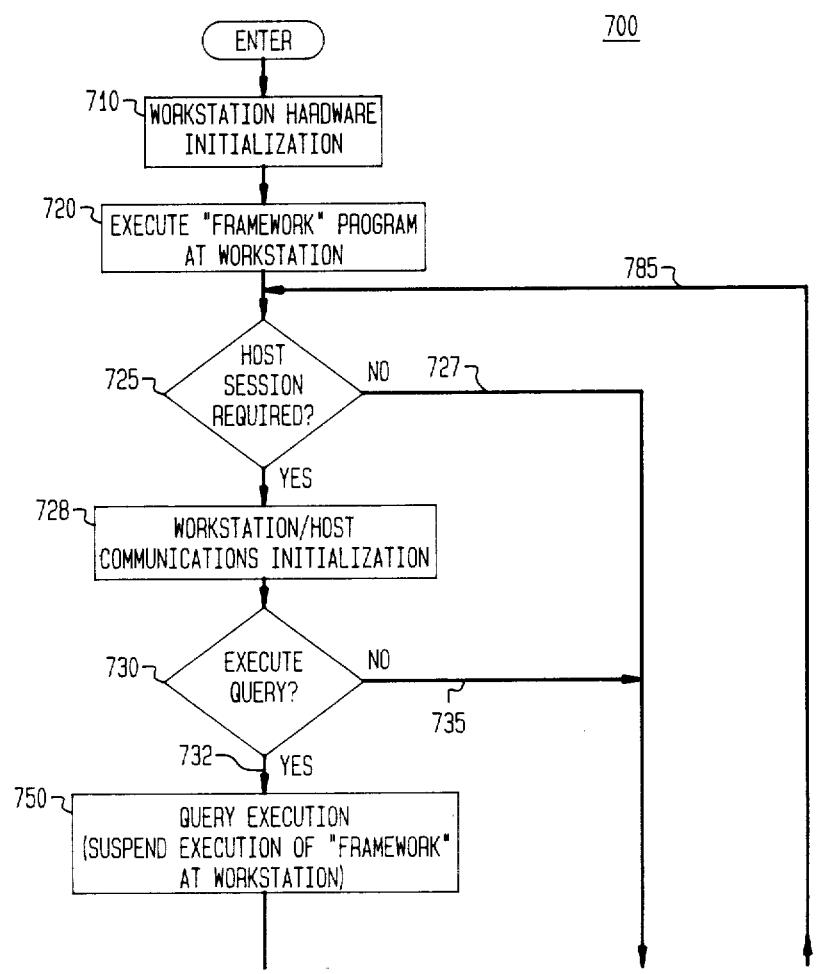
FIG. 7A

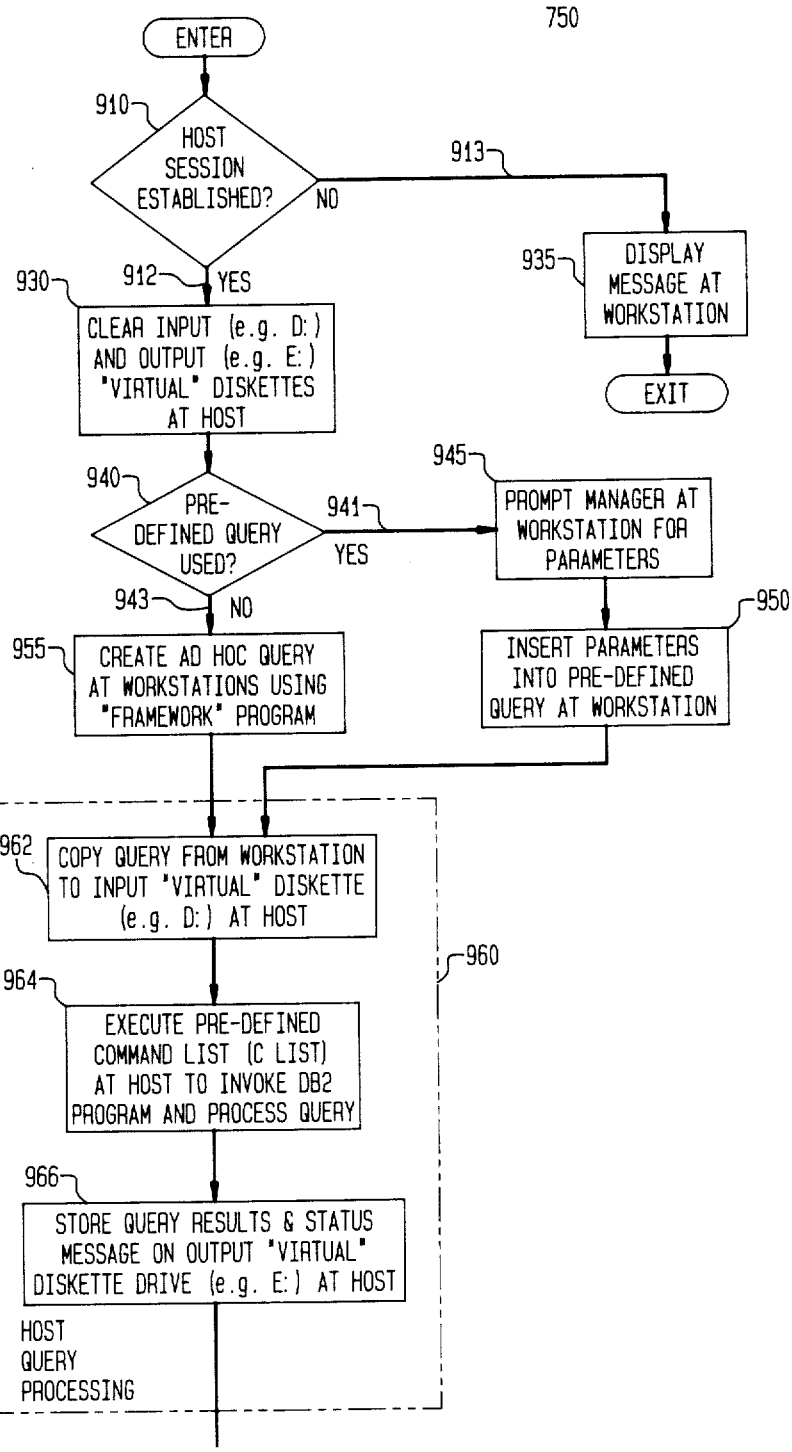

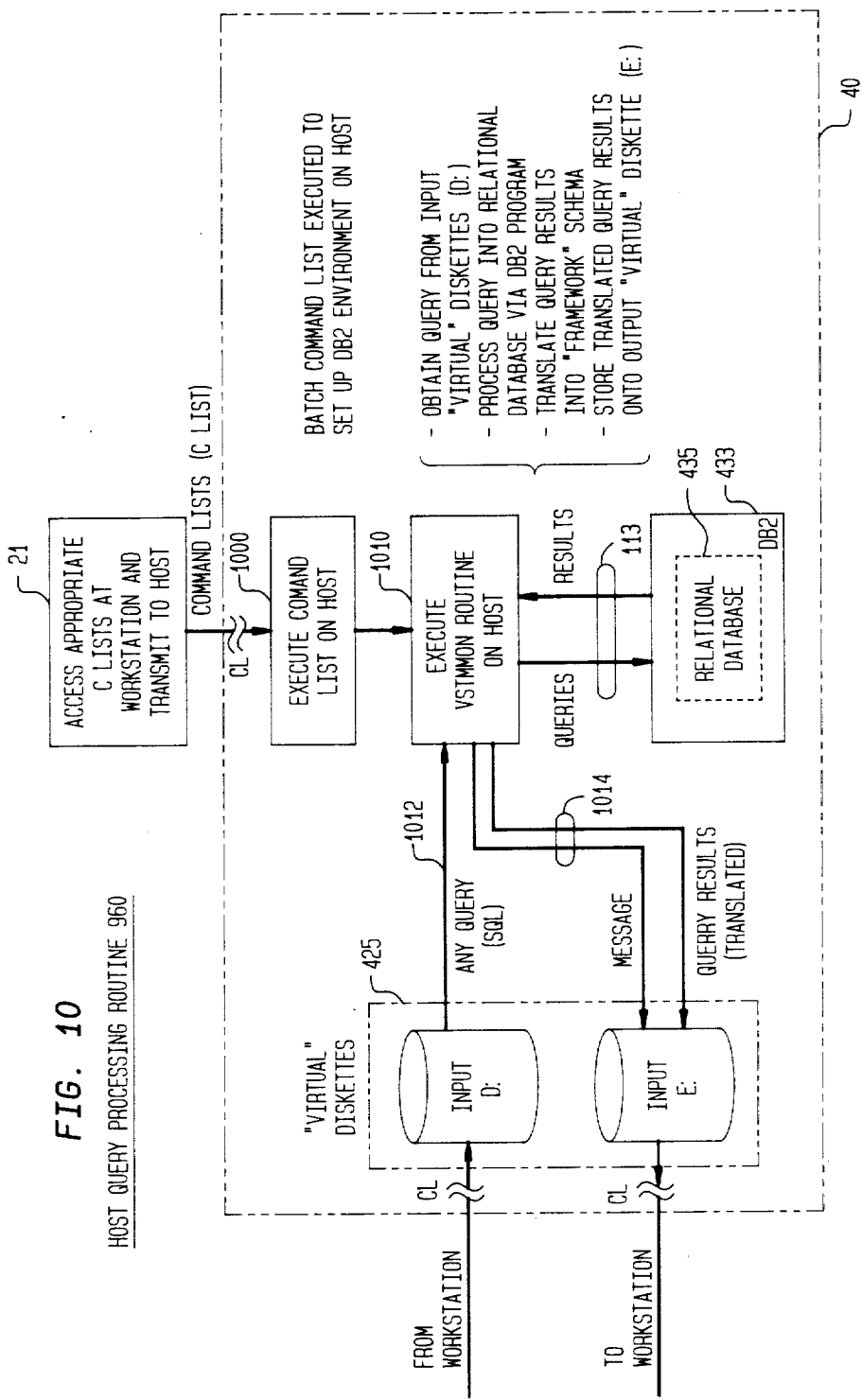

EXTRACT FUNCTION

FIG. 13

QUERY REQUEST

Disk  Create  Edit  Locate  Frames  Words  Numbers  Graphs  Print

```
[Query]
select ORGANIZATION, OPEN_MRS
from MAINTENANCE_REQUEST_DATABASE where
date = CURRENT_DATE
group by ORGANIZATION, DATE
order by ORGANIZATION
```

1310 →

| ORGANIZATION | OPEN_MRs |
|---|---|
| 25300 | 1492 |
| 25330 | 141 |
| 25331 | 141 |
| 25350 | 568 |
| 25351 | 75 |
| 25352 | 119 |
| 25353 | 100 |
| 25354 | 118 |
| 25355 | 110 |

1320

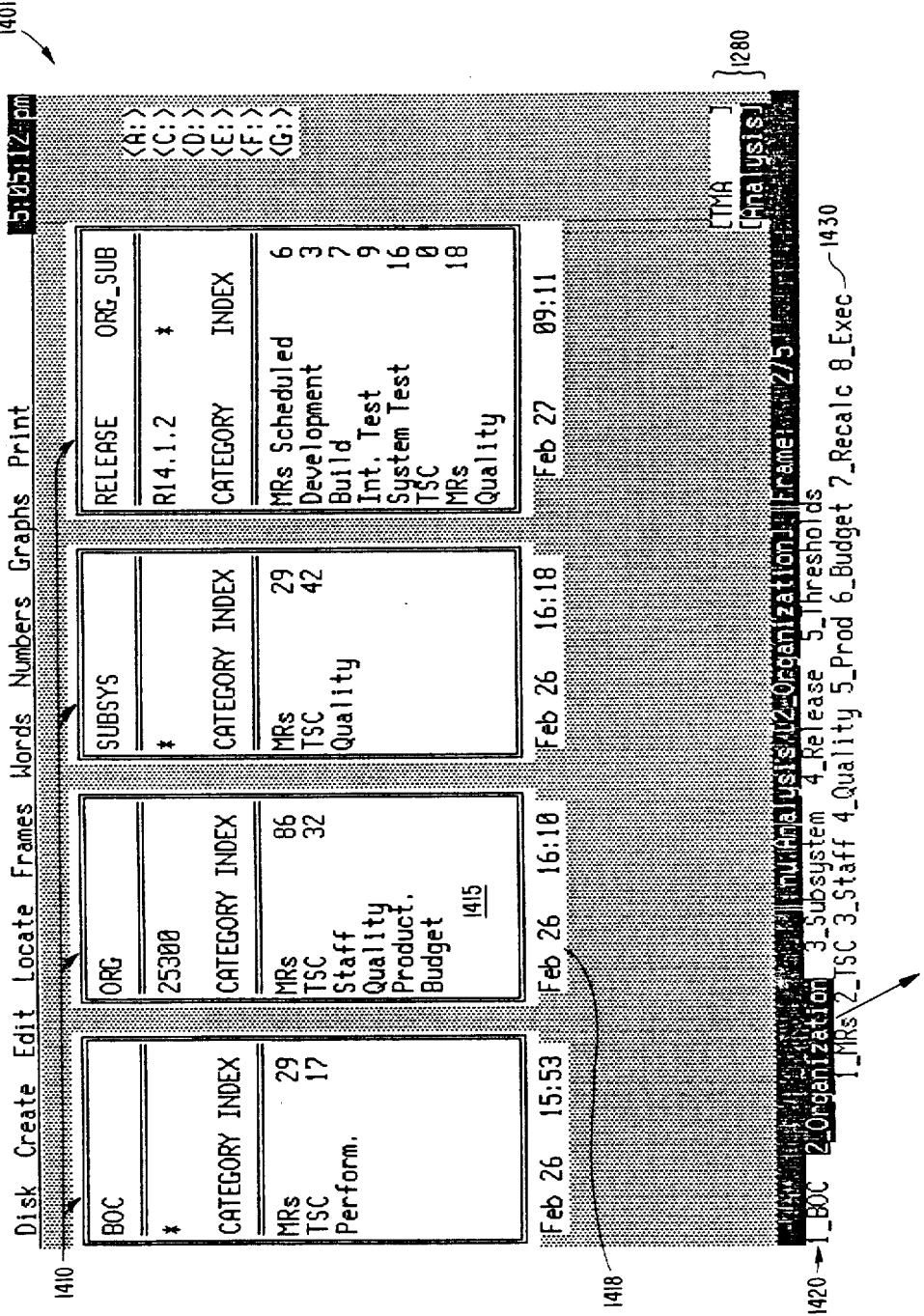

FIG. 14B

ORGANIZATION ANALYSIS SCREEN

Disk  Create  Edit  Locate  Frames  Words  Numbers  Graphs  Print

```
BOC
────────────────
*
────────────────
CATEGORY  INDEX
MRs         29
TSC         17
Perform.
────────────────
Feb 26  15:53
```

```
ORG
────────────────
25300
────────────────
CATEGORY  INDEX
MRs         86
TSC         32
Staff
Quality
Product.
Budget
────────────────
Feb 26  16:10
```

```
SUBSYS
────────────────
*
────────────────
CATEGORY  INDEX
MRs         29
TSC         42
Quality
────────────────
Feb 26  16:18
```

```
RELEASE      ORG_SUB
────────────────
R14.1.2        *
────────────────
CATEGORY       INDEX
MRs Scheduled    6
Development      3
Build            7
Int. Test        9
System Test     16
TSC              0
MRs             18
Quality
────────────────
Feb 27  09:11
```

1_MRs  2_TSC  3_Staff  4_Quality  5_Prod  6_Budget  7_Recalc  8_Exec  
MR Statistics

[TMA]
[Analysis]
[ORGanlyst]

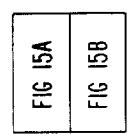
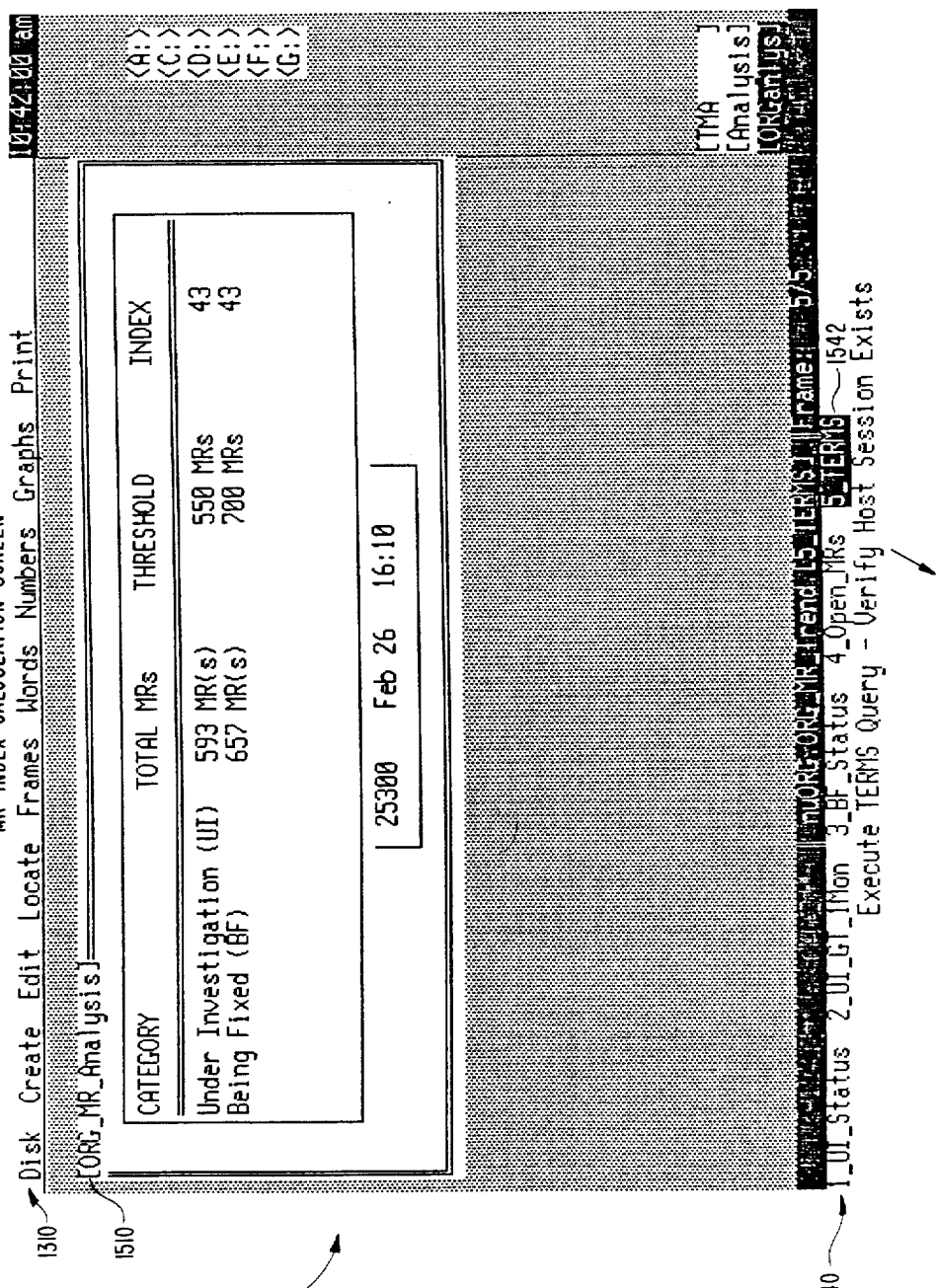
FIG. 15A  MR INDEX CALCULATION SCREEN

*FIG. 15B*

"TERMS" SUPPORT SYSTEM SCREEN

```
------------- TERMS Project Management Workcenter ------------- 86/04/04 10:19
OPTION ===>
                        Functions Available:

EDIT                 REPORTS                    WORKLIST

1  Add New MR         4  Catalogued Reports     5  Approve MRRs         (23 )
    2  Edit or Browse                               6  Approve Priority     (9  )
       via Selector                                 7  Re-Assign Review     (3  )
    3  Inactive MRs                                 8  Defer MR Approval    (NONE)
                                                    9  Entire Worklist      (35 )
```

1508

ORGANIZATION MR
ANALYSIS TREND CHARTS

| FIG. 16A |
| FIG. 16B |
| FIG. 16C |
| FIG. 16D |

DISTRIBUTED MANAGEMENT SUPPORT SYSTEM FOR SOFTWARE MANAGERS

FIELD OF THE INVENTION

The invention relates to apparatus for a distributed computer based management support system for providing information to software managers regarding large scale on-going software development efforts and a method for use therein.

BACKGROUND OF THE INVENTION

Developing a large scale software systems has often consumed an inordinate amount of time and effort and has proven to be extremely difficult to effectively monitor and control.

Often, a large scale software system, will contain a number of software subsystems each of which is formed of modules. Each module provides a specific low level function. Various modules are integrated together at a higher functional level into a particular subsystem in order to provide a specific task. All the subsystems are integrated together at an even higher functional level, through an appropriate program, to allow data to pass between the subsystems as needed and thereby provide the full functionality required of the entire system. The current status of each subsystem must be known at all times in order to effectively monitor and control the development of the entire system.

An illustrative example of a large software system that finds widespread use by the Bell Operating Companies (BOCs) is the TIRKS System (TIRKS is a trademark of Bell Communications Research, Inc.).

At its inception during 1972-1973, the TIRKS system began as a relatively small system. An early version of the TIRKS system was written in assembler language for the IBM Model 360/370 computer. At that time, the TIRKS system had only 5 subsystems. Its function was simply to track inter-office circuit orders and inventory inter-office equipment and facilities. To exploit advances in computer and communication technology and thereby enhance the capabilities of the TIRKS system, new subsystems and modules have been added. Currently, the TIRKS system contains approximately 50 different subsystems that together utilize approximately 10 million lines of source code spread across approximately 23,000 different modules. These subsystems now provide a number of diverse functions; such as marketing (accepting customer orders for inter-office network services), provisioning (equipment and facility inventorying, order tracking; and inter-office equipment and facility assignment), operations (establishing actual inter-office connections, and monitoring and testing of the interoffice network).

Now, with this overview of a large scale software system, such as the TIRKS system, in mind, each subsystem that forms a part of the software system has a "life cycle" comprised of several distinct phases. The activities that occur at each phase vary depending upon whether the software system is entirely new or is on-going and evolving, such as the TIRKS system. Simplistically speaking, the first activity for a new system is the "conceptualization" phase which occurs at the beginning of the entire development effort. During this phase, one or more project goals are first defined and then various alternative solutions aimed at achieving these goals are proposed. Thereafter, during the "design" phase, the chosen solution is parsed into viable subsystems and constituent modules, and all the subsystems and modules are designed. Subsequently, during the "implementation" phase, all the subsystems and accompanying modules are coded. Once coding has been completed, each module is then "tested" and thereafter integrated into its corresponding subsystem which is itself then tested. The entire software system then undergoes system testing—usually first in a development environment and later in a user environment. After system testing has been completed, the entire software system enters the "production" phase in which it is provided to a user for actual use. Frequently, a subsystem will contain an unforeseen error, i.e. a "bug", which will only be discovered during actual use. Each "bug" is eliminated by first detecting its cause, and then conceptualizing and designing a solution followed by suitably modifying the appropriate subsystem. Thereafter, the modified subsystem is tested to ascertain that it operates properly before it is then put into actual use. Moreover, as computing technology changes, one or more subsystems, and possibly the entire software system, may be re-designed and recoded to take advantage of intervening advances that have occurred since the time the entire system was first implemented.

For an on-going software system, such as the TIRKS system, the conceptualization phase is driven by both user requirements and technological advances. First, maintenance requests (MRs) and/or user requested enhancements (hereinafter collectively referred to as user requests) for each subsystem are determined. Each MR documents an improperly performing function that exists in a current subsystem and serves as a request to ascertain the cause of the malfunction and appropriately correct the subsystem. Enhancements, by contrast, are desired features that do not currently exist in a subsystem. Once the user requests have been obtained, their implementation is decided. In certain instances, an existing subsystem can be changed to satisfy these user requests and, in other instances, new subsystems must be completely designed. The conceptualization phase phase also involves determining what additional subsystems must be added to the TIRKS system in order for it to exploit advances in computing and/or communication technology. Each software developer assigned to the TIRKS system is responsible for a particular "unit" of the system. This unit may comprise one or more modules or an entire subsystem. During the "design" phase, each developer designs the software to provide the requested modifications and enhancements applicable to his unit. This unit of software is then coded by each developer during the subsequent "implementation" phase. The "testing" phase consists of three separate activities: unit testing, integration testing and system testing. Initially, each software developer independently tests his own unit of work. Specifically, each developer writes a test routine which provides simulated inputs to the software unit he is testing and then records the results. Once this has occurred, the tested subsystems are integrated together and tested as a whole to ensure that software interfaces properly pass data between the individual subsystems. Thereafter, the entire system is tested to ensure that enhancements and modifications function properly. After the conceptualization, design and testing phases have been completed, a particular release of the TIRKS system emerges. At that point, the release is provided to each BOC which performs acceptance testing in an isolated environment prior to placing the release into actual commercial use. Even after all this testing has been performed, problems may still arise in the field necessitating additional MRs and further iterations through conceptualization, design and testing phases to remedy these remaining problems.

During 1985, approximately 320 releases of the TIRKS system were delivered to all the BOCs. Each release contained between 1 module for an emergency release—a release designed to correct one specific malfunction occurring in that module—to a major release containing as many as 2,000 modules. Generally, about 30 releases are being simultaneously developed at any given time.

Because of the enormity of the software development effort required to maintain and support the TIRKS system and the large number of subsystems involved, a management information (MIS) system is needed to effectively monitor the TIRKS system; and, specifically, to efficiently allocate available development resources, as the need arises, for developing new subsystems and for properly maintaining all the existing subsystems in a timely manner. Specifically, all the users prioritize their MRs and specify the order in which these MRs are to be handled. To ensure that all the MRs are being handled in a manner consistent with BOC requirements, the MIS system must constantly monitor the software development life cycle of every subsystem in each release of the TIRKS system that is in use and provide current information to management. This information permits management to effectively re-allocate resources (development personnel and hardware facilities), if necessary, to assure that these requirements will be met.

One such MIS system used a variety of specialized software support systems to provide specific information relating to one or more phases of the life cycle of each subsystem that formed the entire software system. These support systems included: planning systems which set milestones for each phase of the development efforts and estimated necessary development resources, scheduling systems which allocated and scheduled specific resources such as programmers, administration systems which tracked budgetary and financial information, marketing systems which logged user requests, systems that tracked source code for each subsystem of each release under development, systems that monitored delivered source code, and systems that prioritized action items and programming responsibilities. Other specialized support systems were used to monitor software test environments for development and integration testing.

Each support system produced some form of report. Although reported data was available for each phase of the life cycle for every subsystem, the data produced by all the support systems could not be easily integrated together to provide the information required by management. For example, assume a manager desired to correlate the trend in new and changed lines of code produced during the development phase with the faults found in the system test phase. This task would be difficult because the data in the support systems is spread across several databases used by these systems. Moreover, these support systems only produced data that reflected current activity and hence failed to provide the most useful management information for detecting bottlenecks in the development process; namely, historical trends, and comparisons between past and present development activities.

In spite of these deficiencies of such MIS systems, managers could obtain useful status information for relatively small software systems under development by separately consulting with each developer. The manager would then assimilate all the information presented from every developer to obtain an accurate assessment of the status of the entire software system. Unfortunately, as the number of developers increased, this management approach became increasingly impractical due to time constraints of the manager and each developer. As a result, an "information crisis" occurred as the size of the software system being developed increased—i.e. as the software system continued growing, managers became increasingly unable to obtain useful status information. Generally, at this point, someone in the development organization recognized the wealth of information provided by the support systems. As a reaction to this crisis, an MIS system was often put in place to automatically extract particular information from all the data provided by all the support systems and provide the extracted results to management in the form of reports.

There are several drawbacks inherent in a reactive MIS system particularly when used to monitor and control the development activities of a large scale ongoing software system, such as the TIRKS system. First, such an MIS system is very inflexible. It only provides the specific information that satisfies a manager's particular needs occurring during an information crisis. As such, a reactive MIS system disadvantageously ignores a development organization's long term information needs. This, in turn, ensures that future information crises will occur and another reactive MIS system will be put in place each time management needs change and managers request different information. Second, a reactive MIS system provides the same reports to all managers. A large scale software system, such as the TIRKS system, with 50 subsystems generally involves many managers. Generally, a manager assigned to the TIRKS system has responsibility over several subsystems. The information needs of one manager are generally not the same as those of another. Hence, MIS systems geared to satisfy the needs of one manager do not satisfy the needs of other managers. As such, reactive MIS systems hide relevant information from some managers and thereby prevent these managers from focusing on their areas of responsibility. Third, the extracted information is geared to that produced by each software support system. Since the support systems only produced data regarding current development activities, reactive MIS systems also failed to provide historical trend information—information essential in managing and controlling large scale software development efforts.

Furthermore, reactive MIS systems disadvantageously inject a large degree of uncertainty into the development schedule of a large software system. First, MIS systems known in the art were often extremely slow to respond and hence presented "stale" information to management. Additionally, the initial estimate of time required to develop a fully functional subsystem was often inaccurate. Thus, with a lack of current information in a delay prone MIS environment, managers were often unable to accurately estimate and schedule the resources required to handle each user request. Second, since a reactive MIS system hid information from managers, many managers were unable to probe deep into the development efforts to investigate and uncover actual causes of delay. Thus, these managers were unable to quickly spot bottlenecks in their area of the development process, and quickly and dynamically re-allocate their available resources in a decisive manner to eliminate these bottlenecks. Ultimately, this uncertainty increased the expense of developing a large scale software system.

For those reasons, MIS systems known in the art can not be used to effectively monitor and control the development of a large scale software system.

Therefore, a need exists in the art for a computer based management support system for monitoring and controlling on-going development efforts of a large scale software system, and, more specifically, for providing whatever information is required by each manager to effectively control and predict the software life cycle of each software subsystem under development. This system should be capable of easily integrating available data from a variety of specialized computer based support systems. As an aid in monitoring present development efforts and in planning future efforts, this system also should preserve historical development information and provide summary and trend data based upon historical performance of past software development efforts. Furthermore, this system should provide a flexible query facility that enables each manager to independently query the integrated data in order to extract information of interest to that manager. This system should also provide an analysis facility which permits the manager to analyze query results in any desired fashion. Lastly, this system should permit managers to verify the integrated data by providing access to each specialized support system.

SUMMARY OF THE INVENTION

The above-described drawbacks inherent in management information systems known in the art are advantageously eliminated in accordance with the teachings of the present invention by a distributed management support system having a host computer, located at a central site, and a plurality of computer based workstations and an associated method for use therein. A number of separate on-line software support systems are constantly executed, at the host or elsewhere, to provide the environment in which each subsystem is developed. The host computer routinely extracts current data on each phase of the software life cycle from data generated by each support system and integrates that data into one relational database. This relational database is situated at the host and can be accessed by any of the workstations. A manager situated at a workstation locally formulates one or more queries to obtain desired information from the relational database. A host session is then established from the workstation, at which time, the query is transmitted from the workstation, via a workstation/host communications interface, to and executed on the host computer. After the host has fully processed the query, the results of the query are downloaded to the workstation that originated the query. The workstation is then used to locally analyze the results of the query and display the results of that analysis in any form, e.g. numerically or graphically, that is desired by the manager in order to yield specific current information regarding any facet of the entire software development project.

The workstation/host communications interface ensures that the host session remains substantially transparent to the manager. As such, the workstation functions as an interpreter between the manager and the host thereby freeing the manager of the need to learn both the logon procedure and the operating system for the host. This advantageously reduces the burden placed on the manager and greatly simplifies the operation of the inventive management support system.

Moreover, by performing data analysis at the workstation, rather than at the host computer, the inventive system advantageously reduces the processing burden placed on the host computer and thereby increases the number of users that can be simultaneously accommodated. In addition, the workstation architecture advantageously allows each manager to process query results in any desired manner independent of that chosen by any other manager.

BRIEF DESCRIPTION OF THE DRAWING

The invention may be clearly understood by considering the following detailed description in conjunction with the accompanying drawing, in which:

FIG. 7 shows the proper alignment of the drawing sheets for FIGS. 7a and 7b;

FIGS. 7a and 7b collectively depict a flowchart of Main Program 700 executed by the inventive system;

FIG. 9 shows the proper alignment of the drawing sheets for FIGS. 9a and 9b;

FIGS. 9a and 9b collectively depict a flowchart of Query Execution Routine 750 also shown in FIGS. 7a and 7b;

FIG. 10 is a flowchart of Host Query Processing Routine 960 shown in FIGS. 9a and 9b;

FIG. 13 shows a typical screen that is displayed by workstation 21 after a simple Query has been processed by host 40;

FIG. 14 shows the proper alignment of the drawing sheets for FIGS. 14a and 14b;

FIGS. 14a and 14b show high level Analysis screens displayed by workstation 21;

FIG. 15 shows the proper alignment of the drawing sheets for FIGS. 15a and 15b;

FIGS. 15a and 15b show typical low level screens, displayed by workstation 21, as part of Organization MR Analysis;

FIG. 16 shows the proper alignment of the drawing sheets for FIGS. 16a–16d;

FIGS. 16a–16d show typical trend charts displayed by workstation 21 for the MR information available through MR Index Calculation screen 1501 shown in FIG. 15a;

To facilitate easy understanding, identical reference numerals have been used to denote identical elements common to the figures.

DETAILED DESCRIPTION

Figure 1:
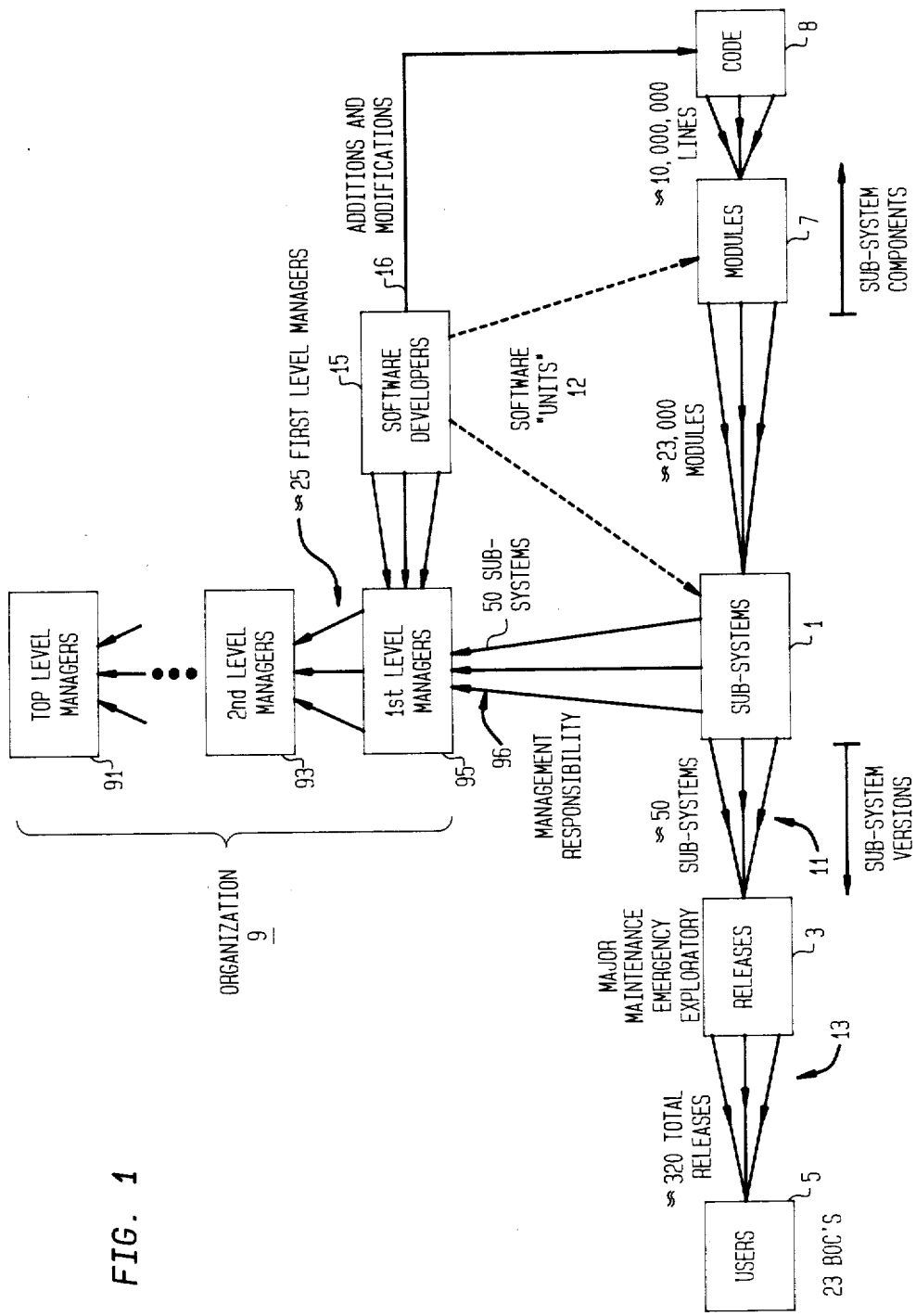
FIG. 1 is a block diagram of the overall organization of a typical large scale software system under development, such as the TIRKS system, including its supporting personnel and users.

After reading the following description, those skilled in the art will readily appreciate that the teachings of the present invention are applicable to any management support system which monitors and controls any large scale software development effort. Nonetheless, to facilitate understanding, the inventive system will be illustratively described in the context of a system that supports the development efforts associated with the TIRKS system. For ease of reference, this particular embodiment discussed below will be hereinafter referred to as the TIRKS Management Aid (TMA).

I. Organizational View of the TIRKS System

To fully understand the manner in which TMA supports the TIRKS system development activities, it is first necessary to appreciate the overall organization of the TIRKS system and its supporting personnel and users. This is diagrammatically shown in FIG. 1.

The TIRKS system is formed of separate software based subsystems collectively shown as subsystems 1. Each of these subsystems provides a particular function and contains one or more modules. All the modules are collectively shown as modules 7. Each module provides a specific low level function and may itself be utilized by one or one subsystems. Modules 7 are formed of code 8. Hence, the modules and code are components of the subsystems.

Approximately 50 subsystems, as depicted by lines 11, form releases 3 of the TIRKS system with each release containing the latest version of a subset of these subsystems. These 50 subsystems contain 23,000 modules that are themselves formed of approximately 10 million lines of code. During 1985, approximately 320 releases were provided, as depicted by lines 13, to all the users, specifically all 23 Bell Operating Companies (BOCs). All the BOCs are collectively depicted as users 5. Four different types of releases exist: major, maintenance, emergency and exploratory. Each release can contain between one module for an emergency release—a release designed to correct one specific malfunction occurring in that module—to a major release containing up to 2,000 modules. An exploratory release is one that contains new features and will be used solely in an experimental environment. Generally, about 30 different releases are being simultaneously developed at any given time.

The entire TIRKS system development organization 9 contains a hierarchy of managers that oversees all the software developers. Specifically, first level managers 95 are directly responsible for the development activities of the TIRKS system and directly supervise software developers 15, with each manager having responsibility over several subsystems. For managerial purposes, each first level manager is assigned ownership of the code that forms these subsystems. Each software developer assigned to this manager is responsible for a particular "unit" of the software that forms these subsystems. Each unit, symbolized by dotted lines 12, may comprise one or more subsystems or several modules, depending upon the complexity and amount of necessary development work associated with each. The end product of the efforts of each software developer is, as symbolized by line 16, new and/or modified lines of code 8. Each of the first level managers 95 reports to an appropriate one of second level managers 93, who, in turn, report through successive higher managerial levels, to top level managers 91. Each group of higher managers contains correspondingly fewer managers.

As discussed in detail below, TMA gathers statistics on the development activities being undertaken in each portion of the TIRKS system shown in FIG. 1 in order to track the life cycle—as discussed below in connection with FIGS. 2a and 2b—of each TIRKS system release. For example, TMA provides data on each development organization, for example the number and status of maintenance requests (which will be defined shortly) that are being handled by the developers situated under each first level manager. TMA also provides data on the status of each subsystem, each release and each maintenance request provided by each BOC. This data provides quantitative information on where each release of the TIRKS system, and its constituent subsystems, lies in its software life cycle. This information permits managers to quantitatively measure the success or failure of particular TIRKS system development activities.

II. The Software Life Cycle

Figure 2:
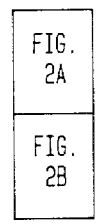
FIG. 2 shows the proper alignment of the drawing sheets for FIGS. 2a and 2b.
Figure 2A:
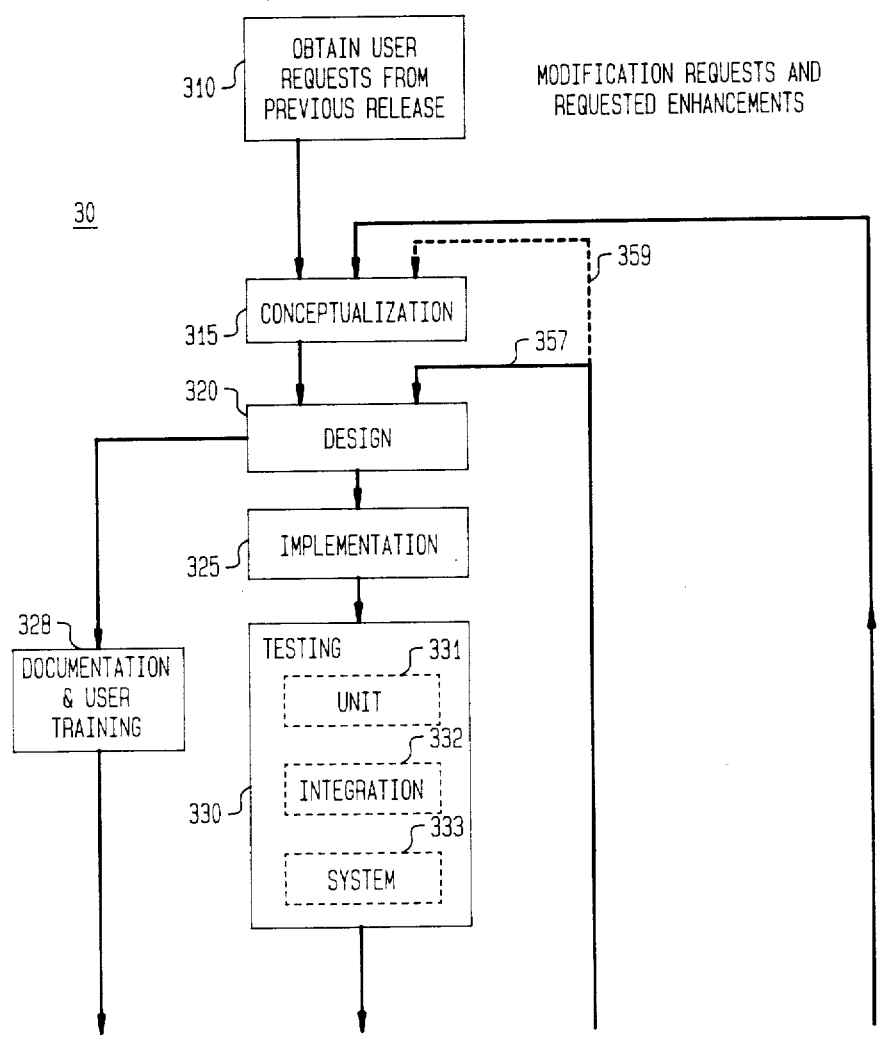
FIGS. 2a and 2b collectively depict a flowchart of a typical life cycle for a release of the TIRKS system shown in FIG. 1.
Figure 2B:
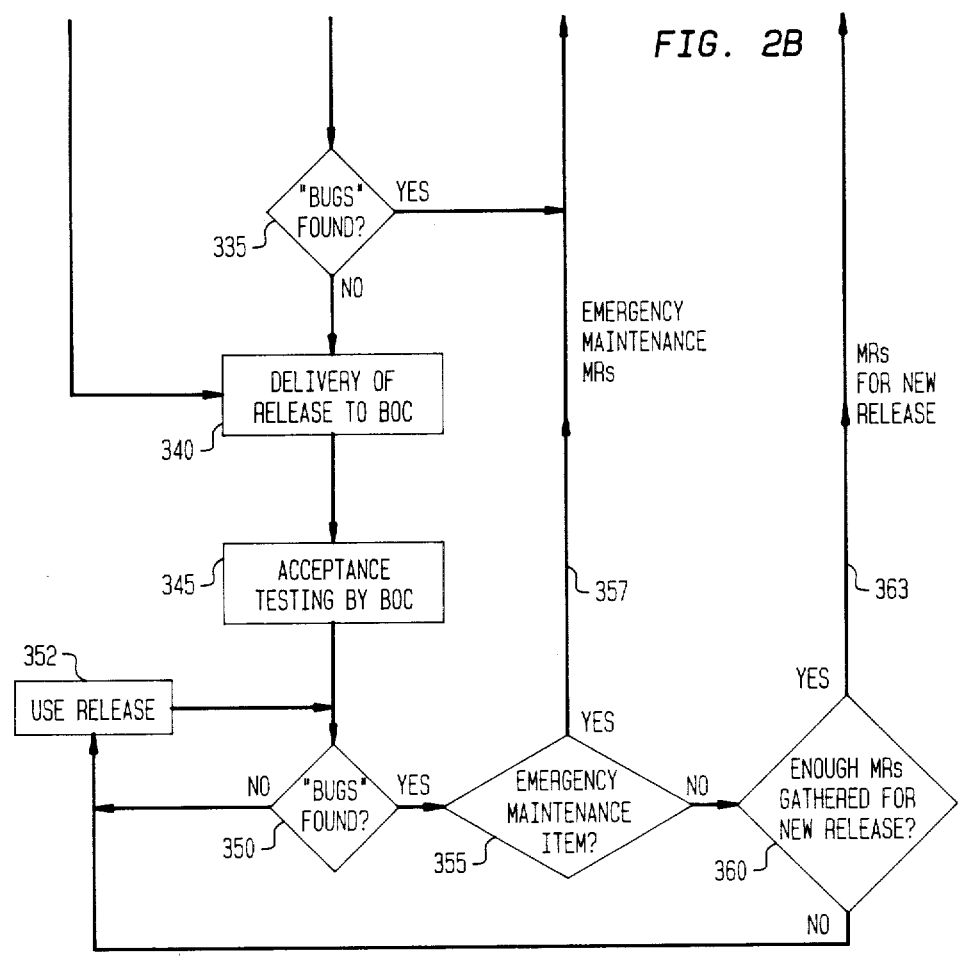

FIGS. 2a and 2b—for which the proper alignment of the drawing sheets for these figures is shown in FIG. 2—collectively depict a flowchart of the software life cycle for a typical release of the TIRKS system. TMA provides data on each phase of the life cycle.

After a BOC places a TIRKS system release into actual use, that BOC may from time-to-time discover that a so-called "bug" appears and causes a subsystem that forms part of that release to improperly operate. To eliminate this bug, the BOC issues a maintenance request (MR) to the TIRKS system development organization and against that subsystem. This MR specifies the erroneous operation of the subsystem and serves as a request to modify the code in order to remove the bug. In addition, BOCs may also request that additional features, so-called enhancements, be added in the future to a properly performing subsystem.

Now, at the beginning of the life cycle for any TIRKS release, user requests (MRs and requested enhancements) are first obtained, as symbolized by block 310. Thereafter, the "conceptualization" phase, depicted as block 315, occurs. During this phase, the manner in which these user requests will be implemented is decided; specifically whether existing subsystems can be appropriately modified to handle these requests or new modules need to be written. Thereafter, during design phase 320, each developer designs the software to provide the user requests applicable to his unit of the TIRKS system. Once this has occurred, each developer writes the spec subsystem interfaces function properly, all the subsystems are integrated together and tested during integration testing 332, and the entire TIRKS system release is tested during system testing 333. If any "bugs" in any subsystem are found during testing phase 330, as represented by the "yes" path from decision block 330, then the design, implementation and testing phases are iteratively repeated, via path 357, to eliminate these bugs. If the remedy for the bug is not readily apparent, then conceptualization phase 315 is re-entered as represented by dotted line 359.

When no "bugs" appear during testing phase 330, then the present release of the TIRKS system is released to each BOC, as shown by block 340. Thereafter, each BOC performs acceptance testing on that release to ascertain it will operate properly in the actual equipment in which it will be used and to detect any residual "bugs". If no "bugs" appear, symbolized by the "no" path from decision block 350, then that release is put into actual use as indicated by block 352. Alternatively, if "bugs" are detected, shown by the "yes" path from decision block 350, each of these "bugs" is classified, as represented by decision block 355, as being either an emergency maintenance item requiring immediate attention or a maintenance item that can be remedied in the next successive release. All maintenance items (maintenance MRs) require re-entry into the design and/or conceptualization phases as shown by line 357 that emanates from the "yes" path of decision block 355. Alternatively, all MRs not requiring immediate attention are accumulated in decision block 360 for incorporation into the next release. Once enough of these MRs have accumulated, the life cycle begins for a new release, as symbolized by line 363. Concurrently with the design, implementation and testing phases, the documentation and user training phases occur, as symbolized by box 328.

One complete iteration through the flowchart shown in FIGS. 2a and 2b produces a TIRKS system release.

III. Overview of the Inventive System

A. Hardware

Figure 3:
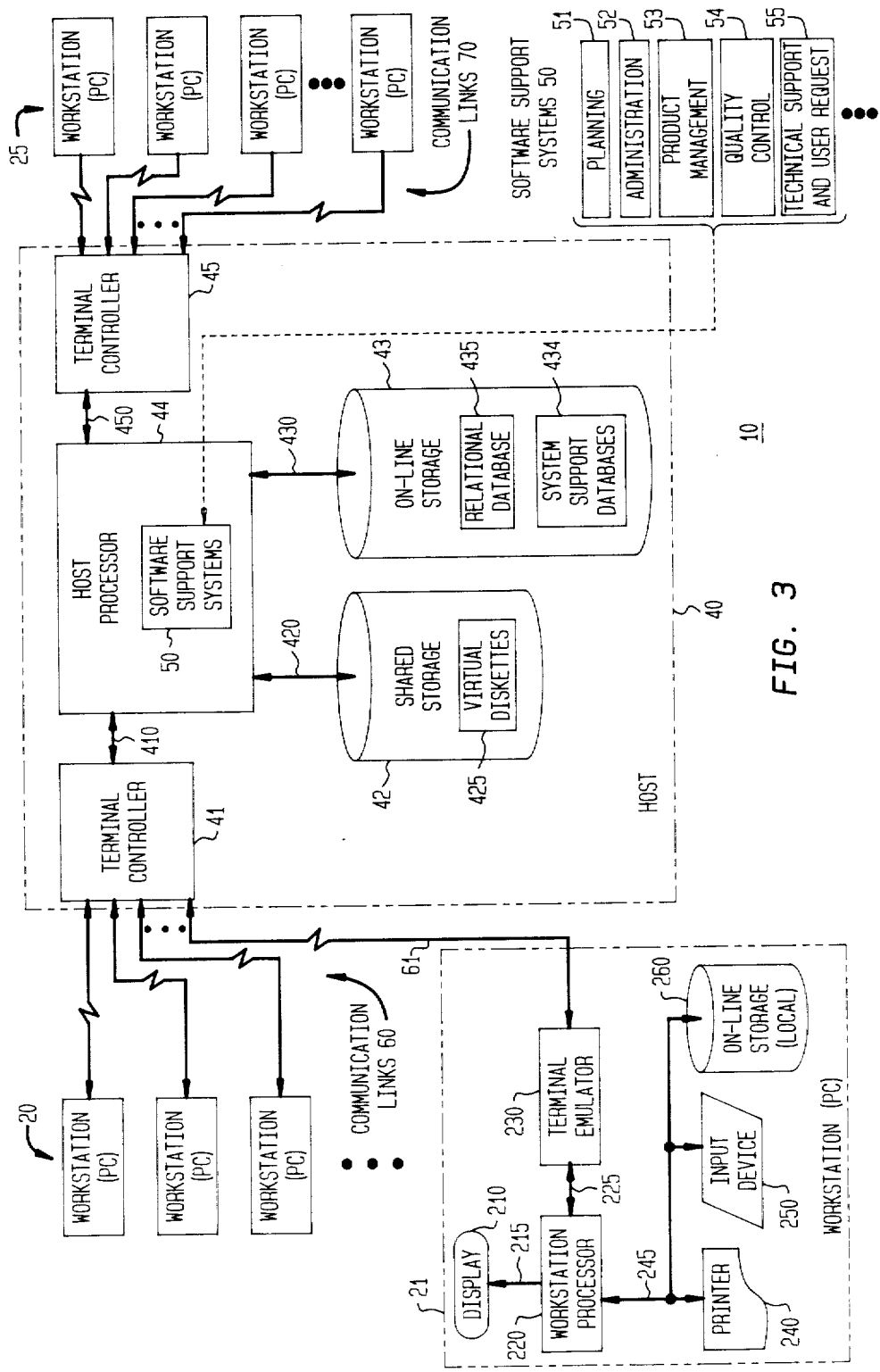
FIG. 3 is a generalized block diagram of the hardware employed in the inventive management support system for monitoring and controlling the development activities of the a large scale software system, such as the TIRKS system shown in FIG. 1.

FIG. 3 shows a generalized block diagram of the hardware used to implement the inventive system. As shown, the system contains host computer 40 and various remote workstations 20 and 25. Each workstation is preferably a personal computer (PC) and is connected through a separate communication link to host computer 40. Host computer is illustratively a System 4081 computer system manufactured by the International Business Machines Corporation (IBM). Communication links 60 and 70 are used to connect workstations 20 and 25, respectively, to host computer 40. For synchronous high speed data transfer, such as through IBM model 3270 terminals, each communication link is preferably a high speed coaxial cable. However, for remote communication, a communication link can be a slower speed asynchronous path over a dial-up telephone line.

Host computer 40, particularly host processor 44, executes a number of specialized software support systems 50, each of which provides a specific management function relating to monitoring and administration of a large software development project, such as the TIRKS system. In TMA, these support systems illustratively include planning system 51, administration system 52, product management system 53, quality control system 54 and technical support system 55. Planning system 51 assists in setting milestones for each phase of the project and in allocating the necessary resources to each task in the TIRKS system development and also provides charts (e.g. well-known Pert and Gant charts) for management use. Administration system 52 monitors and tracks budgetary and financial information relating to all facets of the TIRKS system development effort. Product management system 53 monitors source code deliverables, i.e. which version of each module has been, is and/or will be supplied to which customer, what modifications have been made to each TIRKS module, and which version of each module needs to be updated and how extensive that update must be. Quality control system 54 periodically tests each module using a pre-defined library of tests, records the resulting performance of each module and maintains performance statistics for each module in the TIRKS system. Technical support system 55 logs user requests for desired enhancements and tracks the rate at which each enhancement is made to the TIRKS system.

Individual databases 434 used by all the software support systems are stored on on-line storage unit 43, typically several multi-platter disk storage units. In addition, as will be explained shortly, host processor 44 periodically extracts data from each of these support system databases and inserts the extracted data into a single relational database 435. This database also resides within on-line storage unit 43. Shared storage unit 42, also a disk storage unit, provides common storage areas. Each storage area, hereinafter referred to as "virtual" diskettes" 425 for reasons that will shortly become clear, is accessible both by host processor 44 and by a single corresponding workstation.

Workstation 21 typifies each of the workstations 20 and 25. As shown, workstation 21, preferably an IBM personal computer (PC) or one compatible therewith, contains workstation processor 220 which is generally a microprocessor and associated circuitry, display 210 which is typically a video monitor, printer 240, input device 250 which is typically a keyboard, and on-line storage unit 260 which is typically a Winchester hard disk unit of the type commonly used in conjunction with personal computers. In addition, for communication with the IBM 4081 computer system that serves as host 40, workstation 21 contains terminal emulator 230. This emulator allows the workstation to appear as an IBM model 3270 terminal and thereby successfully communicate with the host computer. An IBM model 3270 emulator or equivalent, such as a Forte 3270 emulator manufactured by Forte Corporation (Forte is a trademark of Forte Corporation), can be used as terminal emulator 230 depending upon whether the personal computer existing within the workstation is an IBM model 3270 PC or an IBM model PC XT. Depending upon the terminal requirements of the particular computer system used for host computer 40, other types of emulators can be employed in lieu of 3270 type emulators. Communication between workstation 21 and host computer 40 is carried over communication link 61 which is a high speed coaxial cable. For slower speed asynchronous communication over, for example, telephone lines, terminal emulator 230 would be replaced by a modem using appropriate communication software. Terminal controllers 41 and 45 located within host computer 40 control the bidirectional communication occurring over communication links 60 and 70, respectively, between all the workstations and host processor 44.

B. Operation

Host computer 40 continually extracts data from support system databases 434 on a nightly basis, as discussed in detail below. During the extract process, the host computer uses all the extracted information to update a common database, i.e. relational database 435.

At any time, a manager located at a workstation, e.g. workstation 21, formulates one or more queries (or uses one or more pre-defined queries) to obtain information from relational database 435 relating to any desired aspect of TIRKS development. Thereafter, the workstation initiates a Time Shared Option (TSO) host session and then loads the queries into the host computer. The host, in turn, executes these queries and downloads the query results into the workstation, via communication link 61. Thereafter, the manager, using software resident at the workstation, appropriately analyzes those answers and then displays the results in a desired fashion—also as set forth in detail below.

C. Software

Figure 4:
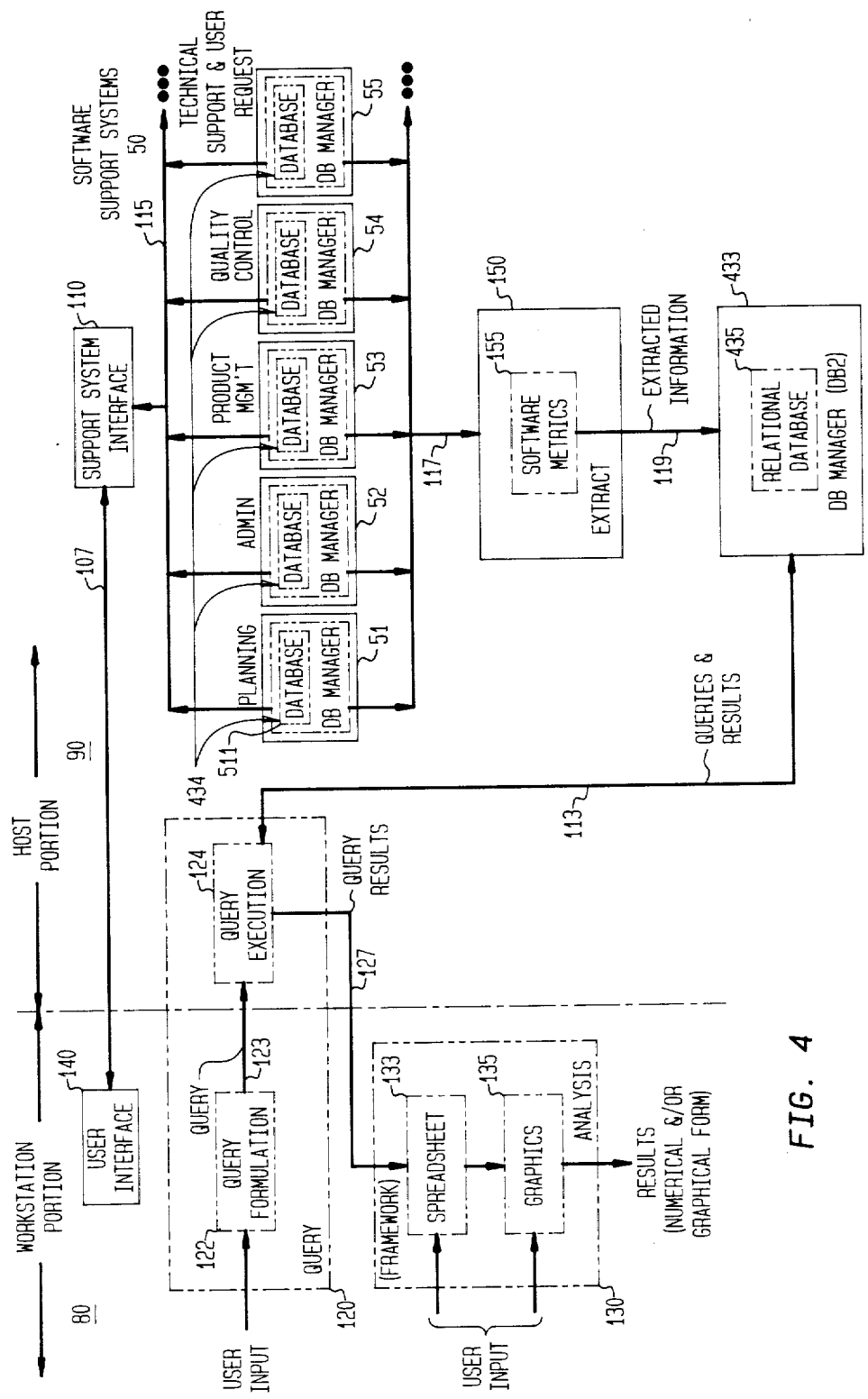
FIG. 4 is an overall block diagram of the data processing software used to implement the inventive system shown in FIG. 3.

An overall block diagram of the data processing software used within the inventive system is depicted in FIG. 4. As shown, the data processing software is split into two portions; namely, workstation portion 80 and host portion 90, which together provide four major functions: an "analysis" function, a "query" function, an "extract" function and a "support system interface" function—each of these functions will be separately addressed in detail below.

In essence, the host portion contains software support systems 50 and relational database 435 along with the necessary software to transfer particular information therebetween. Specifically, information is extracted, via extract function 150, from all individual databases 434 that form part of the software support systems, e.g. database 511 located within planning system 51, and is then used to update relational database 435. Desired information is accessed from the relational database, via query execution sub-function 124 of query function 120. The relational database and its management system are implemented using the IBM "DB2" program. Queries to DB2 management system 433 are written in the IBM Structured Query Language (SQL). "DB2" and "SQL" are trademarks of the International Business Machines Corporation.

Fabricating queries is a function relegated to workstation portion 80 of the inventive system. In particular, a manager constructs one or more queries (or uses pre-defined queries) at the workstation using query formulation sub-function 122 to obtain certain information regarding the development activities for the TIRKS system. This sub-function is provided by a text processor. Thereafter, the workstation establishes a host session between it and and the host computer, in a manner to be described shortly. The queries are then transmitted to the host computer where they are executed by query execution sub-function 124. A response from the host, typically the results of the queries or an error message, is then communicated back, via path 127, to the workstation. Thereafter, the host session is placed in a wait state by the workstation. The manager then appropriately instructs the workstation through analysis function 130 to locally analyze the results of the queries in a desired fashion and thereafter present the results in a particular numerical and/or graphical format. A commercially available integrated word processing, spreadsheet and graphics program known as the "Framework" program manufactured by Ashton-Tate Company is used at the workstation to provide text processing for query formulation sub-function 122; and spreadsheet sub-function 133, and graphics and presentation sub-functions 135 for analysis function 130. "Framework" is a trademark of the Ashton-Tate Company.

The workstation re-activates the host session when it requires data from the relational database resident at the host. During such a session, the workstation first passes queries to the host through suitable handshaking, then waits for the host to process these queries, and finally receives query results from the host, again through suitable handshaking. Even though the workstation may frequently invoke a host session to repeatedly query the relational database, the host session should remain transparent to the manager, unless an error condition occurs. In the present embodiment, a manager receives a series of messages, such as "Host Session Established" or "Process Successfully Complete", sequentially displayed at the workstation to indicate the status of the host session.

Within host portion 90, databases 434 contain at least one separate database for each software support system, such as database 511 located within planning system 51. The software support systems are continually run within the host computer to provide the actual development environment used by the TIRKS software developers. For example, one system within support systems 50 allows a developer to access and edit any TIRKS module. Technical support and user request systems 55 provide raw statistics concerning the current and future development activity for each subsystem in each release of the TIRKS system. Other support systems are used to monitor test environments for testing modules and subsystems.

On a nightly basis, the host extracts this status information from each support system database in order to update relational database 435. The extract process, as discussed in detail below, also summarizes and calculates trends in the extracted data. As distinguished from prior art MIS systems, the data stored in the relational database does not represent the raw statistics provided by each support system, but rather is indicative of the entire life cycle of a TIRKS subsystem. To reduce the amount of extracted information, software metric tables 155 are used to hold the information that is extracted from each of these databases. Typically, these metric tables are established to measure user requests, software performance, work item scheduling, new software development activities, and quality assurance. The metrics used in these tables can be changed quickly and easily, by executing suitable queries through the relational database, as the information needs of each TIRKS manager changes.

The inventive system also provides the manager, via user interface 140 and data path 107, with access to each separate software support system. The functionality provided to the manager, via the support system interface, is that provided by the accessed support system that forms part of software support systems 50. For example, if one support system, such as user request system 55, provides a query facility, then the manager can execute queries into database(s) located within that support system, e.g. database 511 located within planning subsystem 51. The following scenario illustrates the importance of support system access. A high level manager observes from a workstation that maintenance requests (MRs) are too high. After analyzing the results of suitable queries to relational database 435, the manager discovers that a new and volatile subsystem is causing a high number of MRs. The manager responsible for this subsystem is contacted. This manager determines, after some investigation using trend data available from the relational database, that these MRs have not been handled because his personnel have been allocated to perform heavy development efforts involving other subsystems in recent months. At this point, the manager now understands the situation, but has yet to solve it. To do so, the manager needs to obtain specific details of each user request for this subsystem, such as each MR being requested and its frequency of occurrence. By virtue of the software metrics, the desired information is not present within the relational database. Therefore, a direct link to the database located within a user request system, that forms part of technical support and user request systems 55, is necessary. This link is provided through user interface 140 and support system interface 110 and provides the manager with the specific cause of these MRs. Once the cause is known, the manager can accurately estimate and then allocate the manpower needed to satisfactorily address these MRs while minimizing the disruption of other on-going development activity for which he is responsible. In addition to providing specific detailed information not available in the relational database, access to the support systems also provides certain specific functions not available through the query function, e.g. canceling an MR for a given subsystem.

IV. Architecture of the Inventive System

A. Host architecture

Figure 5:
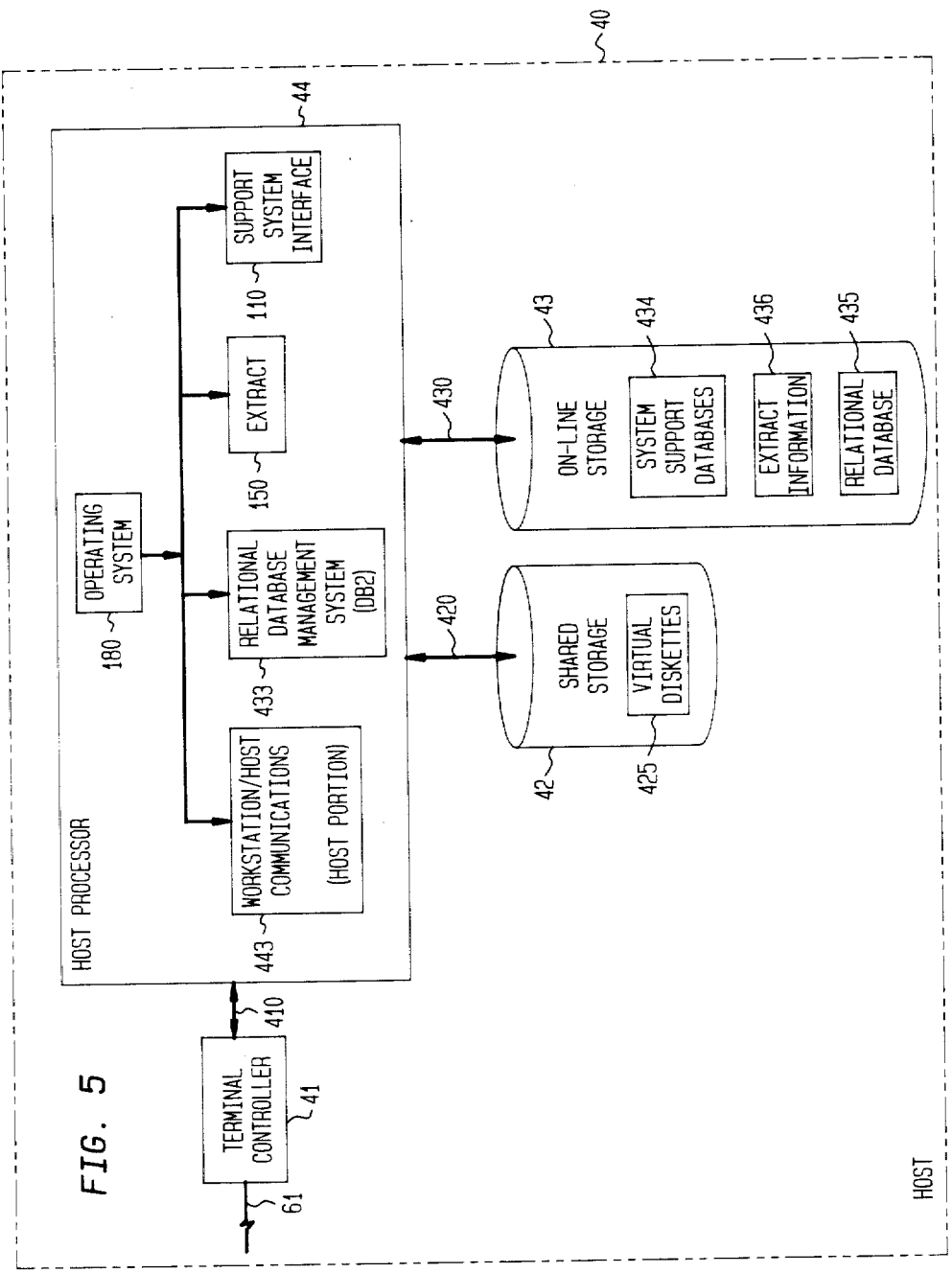
FIG. 5 is a block diagram of the basic architecture of host 40 shown in FIG. 3.

A block diagram of the architecture of that portion of the inventive system implemented within host 40 is depicted in FIG. 5. As previously discussed, the host contains host processor 40, terminal controller 41, shared disk storage unit 42 and on-line disk storage unit 43. The software executed in the host is essentially two-level: operating system 180 which exists at the kernel of the system and various applications programs; namely, workstation/host communication program 443, relational database management system (DB2) 433, extract program 150 and support systems interface 110. The workstation/host communication program provides a "hook" into host operating system 180. This "hook" enables the workstation to initiate a TSO host session and have commands entered at the workstation and executed on the host. Preferably, the workstation/host communication program is implemented using the "Tempus-Link" program developed and manufactured by Micro-Tempus Corporation located in Montreal, Canada ("Tempus/Link" is a trademark of Micro-Tempus Corporation). One portion of the Tempus/Link program resides in the host, and another portion resides in the workstation. This communications program along with terminal controller 41 located at the host, and terminal emulator 230 and terminal emulation software 476 both located at the workstation—discussed below in conjunction with FIG. 6—will be collectively referred to as the workstation/host communications interface.

B. Workstation architecture

Figure 6:
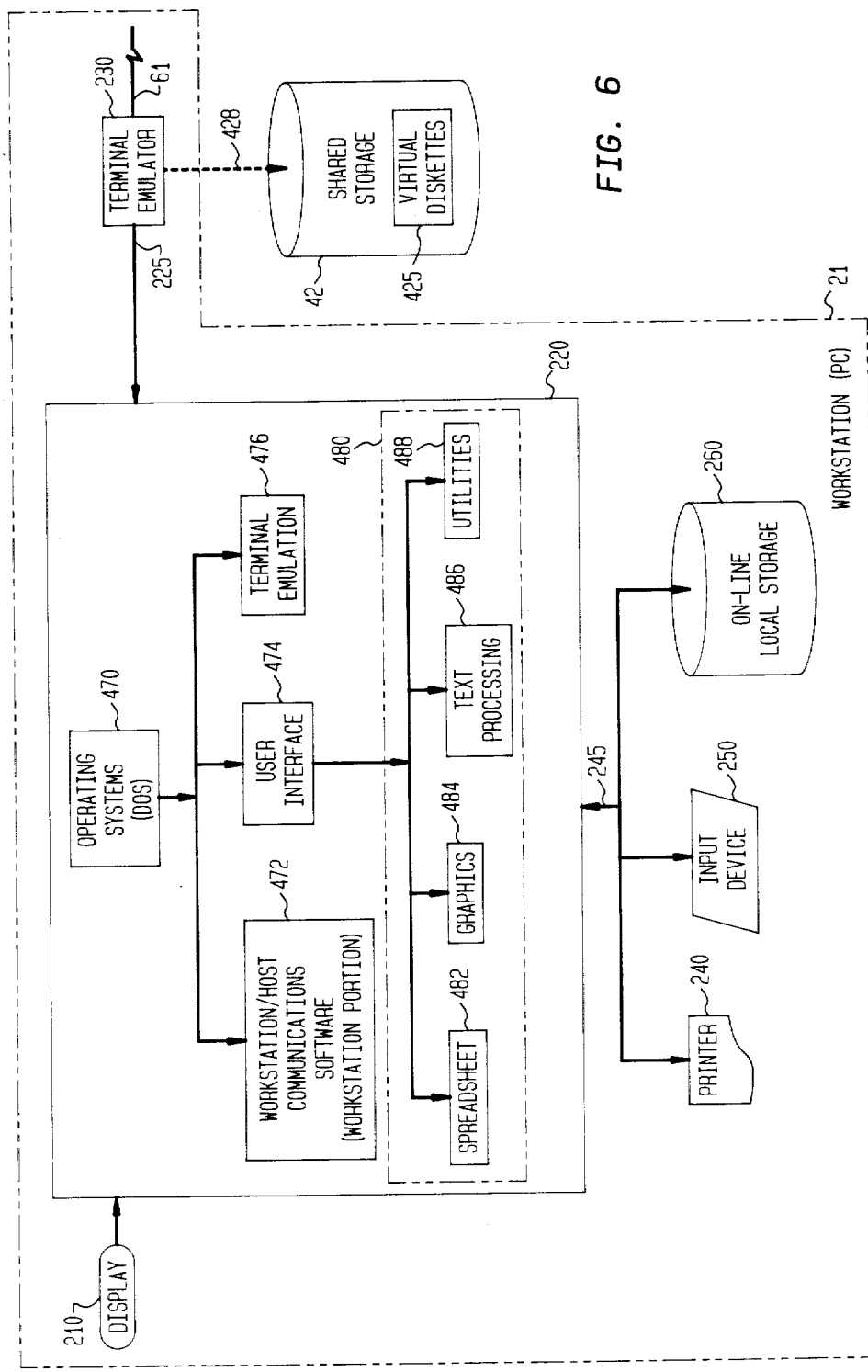
FIG. 6 is a block diagram of the basic architecture of workstation 21 shown in FIG. 3.

A block diagram of the architecture of that portion of the inventive system implemented within workstation 21 is depicted in FIG. 6. As previously discussed, workstation 21 contains workstation processor 220 connected to terminal emulator 230 and to a variety of peripherals including printer 240, input device 250 (typically a keyboard) and local on-line hard disk storage unit 260.

The hierarchy of the software executed by the workstation processor is essentially three-level. Operating system 470 (typically the IBM personal computer disk operating system commonly known as PC-DOS or a compatible operating system) exists at the upper-most level of this hierarchy and provides supervisory control of the microprocessor system located within the workstation. The second level of this hierarchy consists of three specialized applications programs: workstation/host communications software 472, user interface software 474 and terminal emulation software 476. The workstation portion of the Tempus/Link software referred to above forms communication software 472. Terminal emulation software 476, which operates in conjunction with terminal emulator 230 as discussed above, allows the workstation to emulate an IBM model 3270 type terminal and thereby communicate with host computer 40. User interface software 474 provides a user-friendly interface between the manager and the workstation and therethrough to the host computer. Through user interface software 474, the manager is able to take advantage of local data processing software resident at the workstation for formulating queries, analyzing query results and presenting these results in any desired numerical and/or graphical fashion. In particular, this resident data processing software provides local capability to perform spreadsheet analysis, to provide graphics capability and to perform text (word) processing and various utility functions, such as communicate with local peripherals 240, 250 and 260. As discussed, these capabilities are provided by the "Framework" program which is indicated as dotted box 480.

Communications software 472 permits the workstation to communicate files and, as noted, provides a "hook" accessible through the workstation into the host operating system. This permits the workstation to execute instructions at the host, such as batch TSO instructions. These instructions may be pre-defined within the workstation and thereafter accessed for subsequent execution on the host. In this manner, the workstation functions as an interpreter situated between the manager and the host thereby advantageously freeing the manager from learning the host logon procedure and/or operating system. This, in turn, greatly reduces the burden placed on a manager and hence substantially simplifies the operation of the inventive management support system.

In operation, as discussed in greater detail below, the manager instructs the workstation to initiate a "Framework" session. During this session, the manager, employing text processing software 486, (i.e. the word processing capability of the "Framework" program) formulates one or more desired queries. These queries are then stored locally within on-line storage unit 260. Thereafter, through workstation/communications software 472, the manager instructs the workstation to execute the queries. At this point, "Framework" program 480 temporarily ceases running at the workstation which, through the use of workstation/host communication software 472, re-activates a host TSO session. Once this occurs, the queries are up-loaded from the workstation onto a "virtual" diskette, located within shared storage 42 at the host, for processing by the host. Thereafter, the workstation, through communications software 472, issues appropriate instructions to the host to process the queries.

Once the queries have been processed, the host, using host portion 443 of the workstation/host communication program (see FIG. 3) writes the results of the queries to another "virtual" diskette located within shared storage 42. Two unique "virtual" diskettes are assigned to each workstation: one for accepting queries from the workstation and another for storing the results of the queries from the host. Each "virtual" diskette is a specific 1 Mega-byte portion of the available disk storage space residing within shared storage unit 42. Both the host portion 443 and the workstation portion 472 of the workstation/host communications program (the "Tempus/Link" program) allow the storage space assigned to each "virtual" diskette to appear to the host computer as a conventional read/write file and also to appear to the workstation to be a conventional floppy disk drive. The data stored on the "virtual" diskette is accessed by the workstation, through "Framework" program 480, in the same manner that the workstation uses to access any of its local disk drives. Specifically, a locally stored file can be accessed through use of a DOS command containing the drive designation, for example "A:", "B:" or "C:", followed by the file name. Similarly, a file residing on a "virtual" diskette can be accessed through the workstation by providing a PC-DOS command containing the "virtual" drive designation for workstation 21, for example "D:" for input to the host or "E:" for output from the host, followed by the desired file name.

Consequently, each "virtual" diskette behaves as if it were simply local storage to the accessing computer (either host or workstation). As such, neither the host nor the workstation needs to be aware that the other exists in order to transfer data therebetween. Hence, the link from workstation 21, through terminal emulator 230, to any of the "virtual" diskettes is effectively represented by dotted line 428.

Once the query results have been written onto a "virtual" diskette by the host, these results are simply downloaded by the host to the workstation and appear locally there as an appropriate data file. Once, this has been completed, the workstation resumes local execution of the "Framework" program. At this point, the manager, through user interface 474 in conjunction with utilities 488—both provided by "Framework" program 480, employs spreadsheet software 482 to analyze the query results and, if desired, to display resulting numerical information in spreadsheet fashion. The manager can also employ graphics software 484 located within "Framework" program 480 to graphically depict the results of this analysis in any desired fashion. Text processing software 486, existing within "Framework" program 480, can also be employed to add suitable textual material to the resulting numerical and/or graphical output information.

V. Software Used in the Inventive System

Now, having described the overall hardware and software components and operation of the inventive system, the discussion will now shift to a detailed discussion of the software used in the inventive system.

A. Main Program

Figure 7B:
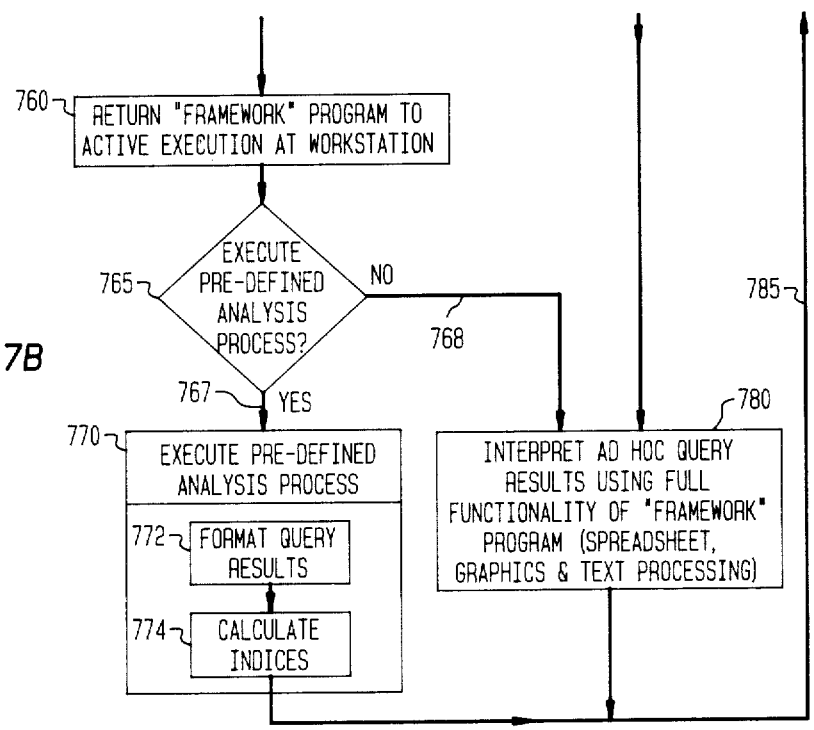

A block diagram of the Main Program executed by the inventive system is collectively shown in FIGS. 7a and 7b—for which the proper alignment of the drawing sheets for these figures is depicted in FIG. 7. This program is iteratively executed by the entire system.

Upon entry into this program, the hardware in the workstation is initialized by execution of block 710. When executed, this block performs power-on diagnostics to ascertain whether the microprocessor system residing in the workstation is operating properly. This block also initializes the "virtual" diskette device drivers and sets up terminal emulation to establish the physical connection between the host and the workstation. After initialization has concluded, control transfers to block 720. This block, when executed, reads the integrated spreadsheet and graphics program, i.e. the "Framework" program, into RAM memory at the workstation and initiates execution of this program. Clearly, if a different integrated spreadsheet and graphics program than "Framework" is used at the workstation, then block 720 would contain suitable instructions to read in these programs and initiate their execution. Once this program is executing, control passes to decision block 725 to determine from the manager whether a host session is required. In the event, the manager requests a host session, then execution proceeds, via the "YES" path from this block, to block 728 to execute the workstation/host communication initialization routine and thereby establish the host session, initiate host execution of the host portion of the workstation/host communications program and establish the necessary "virtual" diskettes at the host—as discussed below in detail in conjunction with FIG. 8. Once block 728 has executed, control passes to decision block 730 to determine whether the manager desires to execute a query. Thereafter, control passes to block 750 to execute the query at the host and temporarily suspend execution of "Framework" at the workstation. As a result of block 750, query results and a status message, indicative of whether the query was successfully processed by the host, are written onto one of the "virtual" diskettes by the host for subsequent downloading to the workstation. Thereafter, block 750 downloads both the query results and the status message to the workstation. The workstation displays this message to the manager as the only indication that a host session occurred. Without such a message, the manager would be totally unaware that the workstation invoked a host session or at least attempted to invoke such a session. Thereafter, control passes to block 760 which returns the "Framework" program to active execution at the workstation. Once this has occurred, execution passes to decision block 765 to determine whether the query results provided by the host are to be analyzed using a pre-defined analysis process stored at the workstation.

Now, if the query results are to be analyzed using a pre-defined analysis process, then control passes via "YES" path 767 emanating from decision block 765 to block 770 which executes the pre-defined analysis process. In particular, block 772 is first executed to format the query results in a manner specified by this process followed by execution of block 774 which calculates and displays pre-defined index values, all as discussed in detail below. Alternatively, if the manager has executed an "ad hoc" query, then execution proceeds via "NO" path 768 to block 780. This latter block provides the full functionality (spreadsheet, graphics and text processing capabilities) of the "Framework" program to the manger for his use in interpreting the query results any way he desires. Execution also proceeds to this block, via paths 727 or 735, in the event a host session is not required, i.e. only local processing is required by the manager, or in the event the manager has decided not to execute a query at the host. After execution of blocks 770 or 780, control iterates, via path 785, to block 725.

B. Workstation/Host Communications

Initialization Routine 728

Figure 8:
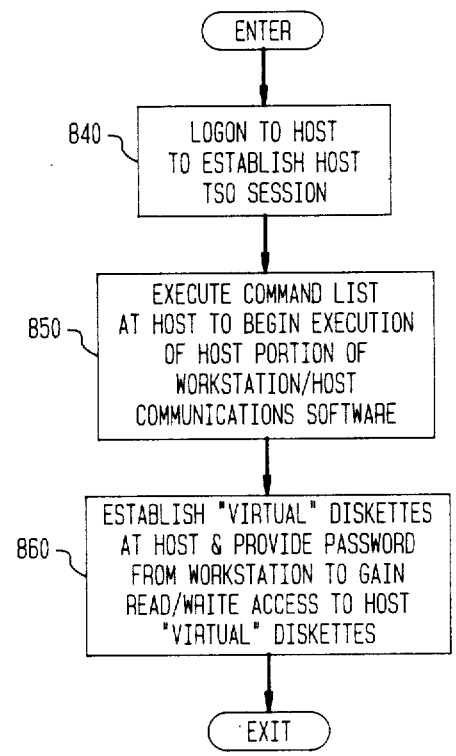
FIG. 8 s a flowchart of Workstation/Host Communications Initialization Routine 728 shown in FIGS. 7a and 7b.

FIG. 8 depicts a flowchart of Workstation/Host Initialization Routine 728 that forms a portion of workstation/host communications software 750, shown in FIGS. 7a and 7b. In essence, this routine establishes a host session, initializes the host portion of the workstation/host communications program and establishes the necessary "virtual" diskettes at the host.

Upon entry into this routine, block 840 is executed. As shown in FIG. 8, block 840 causes the workstation to transfer well known pre-defined command sequences to the host to establish a TSO host session between the workstation and the host. With a host session established, control passes to block 850. Here, the workstation accesses a suitable command pre-defined list from its local storage (e.g. on-line disk storage 260 shown in FIG. 6) and transfers these commands to the host. This command list contains suitable instructions to the host operating system (operating system 180 shown in FIG. 5) to cause the host to begin actively executing the host portion of the workstation/host communications program. Generally, this portion is stored on disk storage at the host and placed in a suitable "wait" state until active execution is requested by the workstation. At that time, the host portion is transferred from disk to RAM memory at the host for active execution. Once active execution of the host portion has begun, control transfers to block 860. This block, when executed, utilizes the host portion of the workstation/host communications program (e.g. the host portion of the Tempus/Link program) to allocate suitable one mega-byte storage areas on shared storage 42 (see FIG. 1) at the command of the workstation. At this point, control exits from this routine with the host being in a wait state ready to process queries emanating from the workstation.

C. Query Execution Routine 756

Figure 9B:
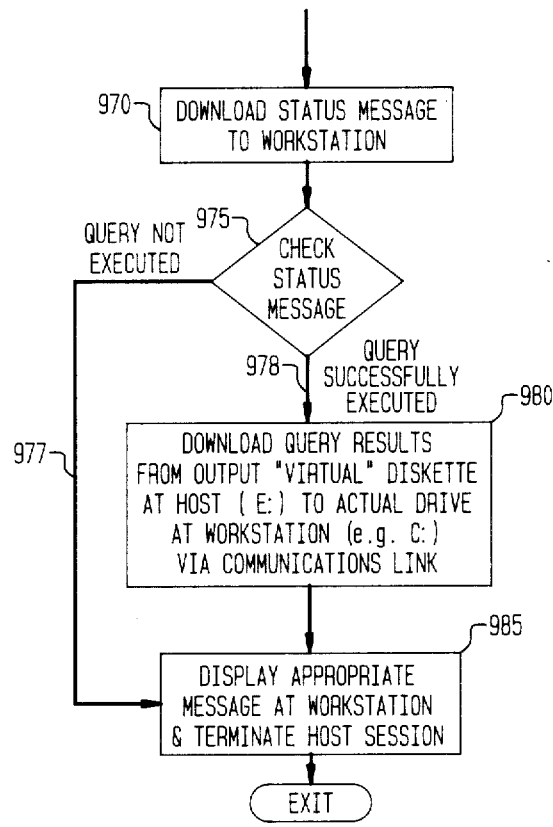

FIGS. 9a and 9b collectively depict a flowchart of Query Execution Routine 750, shown in FIGS. 7a and 7b. The proper alignment of the drawing sheets for FIGS. 9a and 9b is shown in FIG. 9. Routine 750, as noted, accepts queries from the workstation, executes these queries through DB2 at the host, and downloads query results and status messages back to the workstation.

Specifically, upon entry into this routine, control first passes to decision block 910 to ascertain whether a host session has been established. If such a session has not been established, then control passes, via "NO" path 913, to block 935 which displays a suitable error message, e.g. "Unable to Establish Host Session", at the workstation. Thereafter, control exits from Query Execution Routine 750. Alternatively, if a host session has been established, control passes via "YES" path 912 from decision block 910 to block 930. This latter block, when executed, causes the host to clear the storage areas allocated to input and output "virtual" diskette drives, illustratively drives D: and E: respectively, located within shared storage 42 at the host (see FIG. 3). Thereafter, as shown in FIG. 9, control passes to decision block 940. This block determines whether a pre-defined query (a so-called "canned" query) is to be used in lieu of one that is to be subsequently composed at the workstation (an "ad hoc" query). In the event, the manager stationed at the workstation requests a pre-defined query, then control passes, via "YES" path 941, to block 945. When executed, block 945 displays a message at the workstation which prompts the manager for necessary input parameters for insertion into the pre-defined query. Once these parameters have been supplied, block 950 is executed to insert these parameters into the pre-defined query and store the resulting query locally at the workstation for subsequent use by Host Query Processing block 960. Alternatively, if the manager has elected to compose a specific query at the workstation, then control passes to "NO" path 943 from decision block 940 to block 943. This latter block, when executed, allows the manager to create such a query at the workstation using the text processing capability of the "Framework" program. Thereafter, this block stores the specific query composed by the manager locally at the workstation for subsequent use by Host Query Processing block 960.

At this point, query processing begins by entry into Host Query Processing block 960. Upon entry into this block, control first passes to block 962 which copies the query stored locally at the workstation onto the input "virtual" diskette (drive D:) at the host. Thereafter, control passes to block 964 to execute a pre-defined command list (a so-called "C list") at the host to bring DB2 into active execution. Normally, the DB2 program is stored on disk storage at the host and loaded into the operating environment of the host early in the morning during system generation. Active execution of DB2 begins whenever the host receives a suitable request from any workstation. In the event, DB2 can not be invoked, because, for example, it has not been previously loaded into the host during system generation, then block 964 merely passes a suitable status message, such as "DB2 Not Active", to the output "virtual" diskette for eventual display at the workstation. Alternatively, once DB2 is actively executing at the host, then block 964 transfers the query from the input "virtual" diskette to DB2 for processing. Once the query has been processed by DB2, the query results from relational database 435 (see FIG. 3), along with an appropriate status message, are placed on the output "virtual" diskette drive at the host by execution of block 966. This concludes host query processing.

At this point, the message is downloaded to the workstation by block 970 which downloads the status message from the output "virtual" diskette drive at the host to the workstation. This message is then checked by decision block 975. If this message signifies that the query was not executed for any reason, then control is transferred, via path 977, to block 985. This block displays an appropriate message, e.g. "Query Not Processed", at the workstation and suspends the host session. Alternatively, if the query was successfully executed then control passes, via path 978, to block 980. This block, when executed, downloads the query results from the output "virtual" diskette, via communications link 61 existing between the workstation and the host, to an actual storage device, such as disk drive 260 (see FIG. 6) situated at the workstation. Thereafter, control passes to block 985, shown in FIGS. 9a and 9b, which, in turn, displays a message at the workstation signifying successful query processing, e.g. "Host Process Successful", prior to suspending the host session. Once block 985 has been executed, control exits from Query Execution Routine 756.

D. Host Query Processing Routine 960

FIG. 10 depicts a more detailed flowchart of Host Query Processing Routine 960 than that shown in FIGS. 9a and 9b.

Specifically, to begin host query processing, workstation 21, as discussed above, accesses a pre-defined list of batch commands (C list) stored locally at the workstation. These commands are transferred over the communications link. This link, referred to as "CL" in the figure, includes (as shown in FIGS. 3, 5 and 6) actual communications link 61, terminal emulator 230 and accompanying terminal emulation software 476 at the workstation and terminal controller 41 located at the host. Once these commands, as shown in FIG.10, are transferred to the host, they are executed by block 1000. These commands cause DB2 to actively execute at the host. Thereafter, these commands call routine "VSTMMON" to execute at the host. This routine, when executed, as depicted by block 1010, performs a number of operations. First, it obtains the query, via data path 1012, from the workstation, via the input "virtual" diskette—e.g. diskette drive D:, located within "virtual" diskettes 425. Then, this routine applies this query, via data paths 113, as input to DB2 management system 433 for processing into relational database 435. Once this processing has been completed, the results are applied, via data paths 113, to routine "VSTMMON" for translation into a schema compatible with the "Framework" program used at the workstation. Finally, this routine stores the translated query results and an accompanying status message, via data paths 1014, onto the output "virtual" diskette, e.g. diskette drive E:, also located within "virtual" diskettes 425 for eventual downloading to the workstation, through the communications link.

VI. Extract Function

Figure 11:
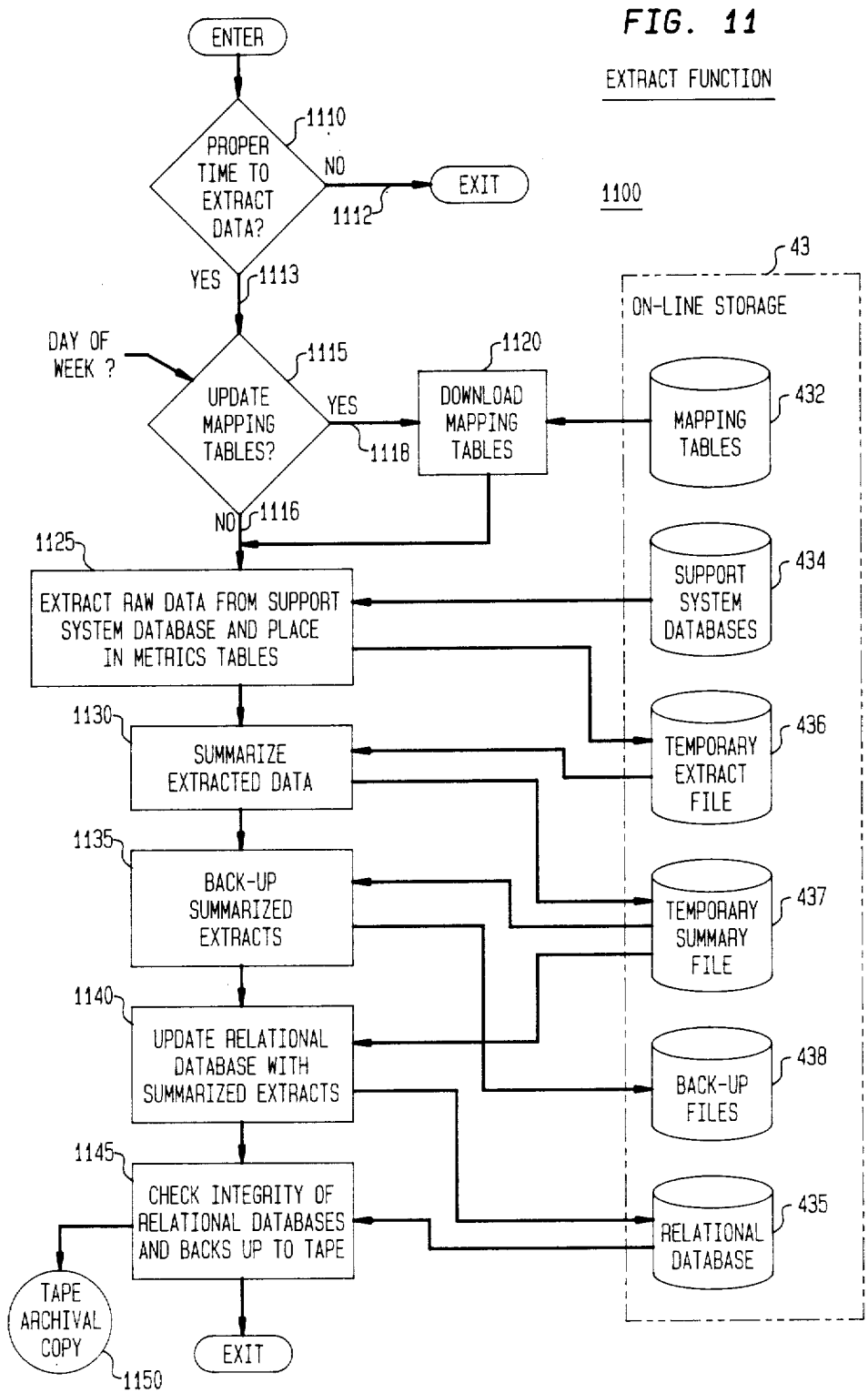
FIG. 11 is a flowchart of Extract Function 1100 executed by the inventive system.

To ensure that the relational database always contains current information, data is extracted nightly, as discussed above, from each of the separate support system databases in the TIRKS system and places that data into software metrics tables. Presently, the TIRKS system extracts data into twelve separate software metrics tables. Once extracted, the data appearing in each of these tables is then summarized and used to update the relational database. Both historical data—each summarized extract dating back at least 6 months and extending to the present—and current data are maintained on-line in the relational database. Since the extract process occurs on a regular basis, trends can be easily observed in the query results. A flowchart of Extract Function 1100 is shown in FIG. 11. The process shown in FIG. 11 is repeated nightly for each different support system database.

The extract function periodically and automatically runs as a background task in the host. To ensure that this function only occurs at a pre-determined time on a nightly basis, control first passes to decision block 1110 which determines whether the current time is appropriate to execute the extract function. If it is not, then control exits from this function, via "NO" path 1112. When the proper time occurs, control passes, via the "YES" path from block 1110, to decision block 1115. This block determines whether mapping tables used in the extract function should be updated. Since these tables rarely change, they are updated only once per week, generally during a weekend. In particular, mapping tables 432 specify the name of each category (field) of data stored in each support system. Oftentimes, the same piece of data is stored in multiple support system databases but referred to by different names. Mapping tables 432 provide a list of the synonymous data names, thereby permitting the same data to be extracted from each of these databases using any one of these names. If these tables should be updated, control passes, via "YES" path 1118, to block 1120 which updates mapping tables 432 from appropriate data provided during the following week and stored on-line within the host. Control then passes to block 1125. In the event, the mapping tables are not to be updated, control also passes to block 1125, via "NO" path 1116.

When executed, block 1125 extracts raw data from one of the on-line support system databases 434 stored within on-line storage 43 and places that data into appropriate software metrics tables. Each of these support systems only provides current data. To conserve the amount of information that is extracted from the support system databases, only selected fields of data, as selected by previously discussed software metrics 155 (see FIG. 4), are extracted and placed into the metrics tables. The extracted data (metrics tables) is temporarily stored on-line in temporary extract file 436. Once the raw extract process has been completed, execution proceeds to block 1130 where the extracted data is summarized by, for example, organization, user group (BOC), subsystem and release and stored in temporary summary file 437. Historically speaking, managers are rarely interested in data on only one specific item, such as a single MR. Instead, managers focus in on performance averages: for example, the total number of open MRs, how many of these MRs have a high priority and the average length of time these MRs have remained open. Unfortunately, the support systems only provide statistics on individual items. Therefore, summarization provides managers with data not obtainable through any one of the support systems, via the support system interface, as discussed above. Once the summarization process has been completed, block 1135 is executed to store a back-up copy of the summarized data onto back-up files 438.

Once the back-up copy has been made, execution passes to block 1140. This block updates relational database 435 using the newly summarized extracted data available on temporary summary file 437. In the event this update fails, block 1135 maintains summarized data for a number of past days, illustratively seven, on-line for back-up purposes. In this manner, data for only one day is lost if an update can not be made on a given day. Since historical summarized data is maintained for the preceding six month period and trends can be calculated therefrom, the loss of data for one day of data has minimal impact on the information provided to the manager. Once relational database 435 has been successfully updated, execution proceeds to block 1145 which checks the integrity of the relational database by executing pre-defined tests of the data stored therein. In addition, this block also generates tape archival copy 1150 of relational database 435 for back-up purposes. Once this back-up copy is made, control exits from Extract Function 1100 and this function is again relegated to a background task.

VII. Analysis Function
A. Overview

The Analysis function detects and highlights potential problems areas in the software development environment. In essence, as discussed earlier, the Analysis function utilizes data provided from the support system databases, and a set of threshold values—to be discussed in detail below. This data is pre-selected to reflect the status of various critical success factors defined by managers and results from executing blocks 1125 and 1130, as shown in FIG. 11. This data is then processed by a set of queries that seek to evaluate the status of these critical success factors. The manager defines a threshold value for each critical success factor. In particular, each time the Analysis function is undertaken, the values of these critical success factors are measured through queries into the relational database and the results are presented using the spreadsheet and graphics capabilities residing at the workstation. The workstation notifies a manager whenever a threshold value he set has been exceeded by the query results. As the priorities of the manager change and different critical success factors are defined, different data can be selected from the software support systems. The queries can then be re-written to appropriately evaluate these new critical success factors, and the accompanying thresholds can be set accordingly. Through the use of pre-defined queries and pre-defined presentations (spreadsheet or graphics and the particular form chosen) catered to the information needs of a manager, that manager can obtain essential information while advantageously expending only a minimum amount of time and effort.

B. Analysis Functions in TMA

The Analysis function, as it pertains to the TIRKS system, identically provides information relating to four functional areas: BOC (User) Analysis, Organization Analysis, Subsystem Analysis, and Release Analysis. BOC Analysis provides data that represents the total of all subsystems that have been provided to a given BOC. Items such as software quality, performance, and the status of user requests (maintenance or enhancement requests) can be selected. Organization Analysis provides data pertaining to all subsystems associated with a given TIRKS system development organization. Information such as quality, productivity, budget and personnel statistics of each TIRKS system development organization can be accessed. Subsystem Analysis provides data that pertains to any particular subsystem within the TIRKS system. Release Analysis provides data that tracks the progress from beginning to end of a new release of the TIRKS system. The data accessible by each functional area is defined by the software metrics and originates from one or more support systems.

Within the "Framework" environment at the workstation, a bulletin board exists for each type of analysis: user, organization, subsystem and release. Each bulletin board—discussed in detail below in the section entitled Illustrative Analysis Display Screens—notifies the manager when a threshold is being exceeded. A set of categories lies within each Analysis function and is listed in each bulletin board. These categories are the critical success factors defined by the manager. An index value is associated with each category. These indices are a function of the data extracted through the software metrics and the corresponding threshold values. A date and time stamp is placed on the bulletin board to document when the analysis function was last performed.

VIII. Illustrative Display Screens
A. Query Display Screens

Figure 12:
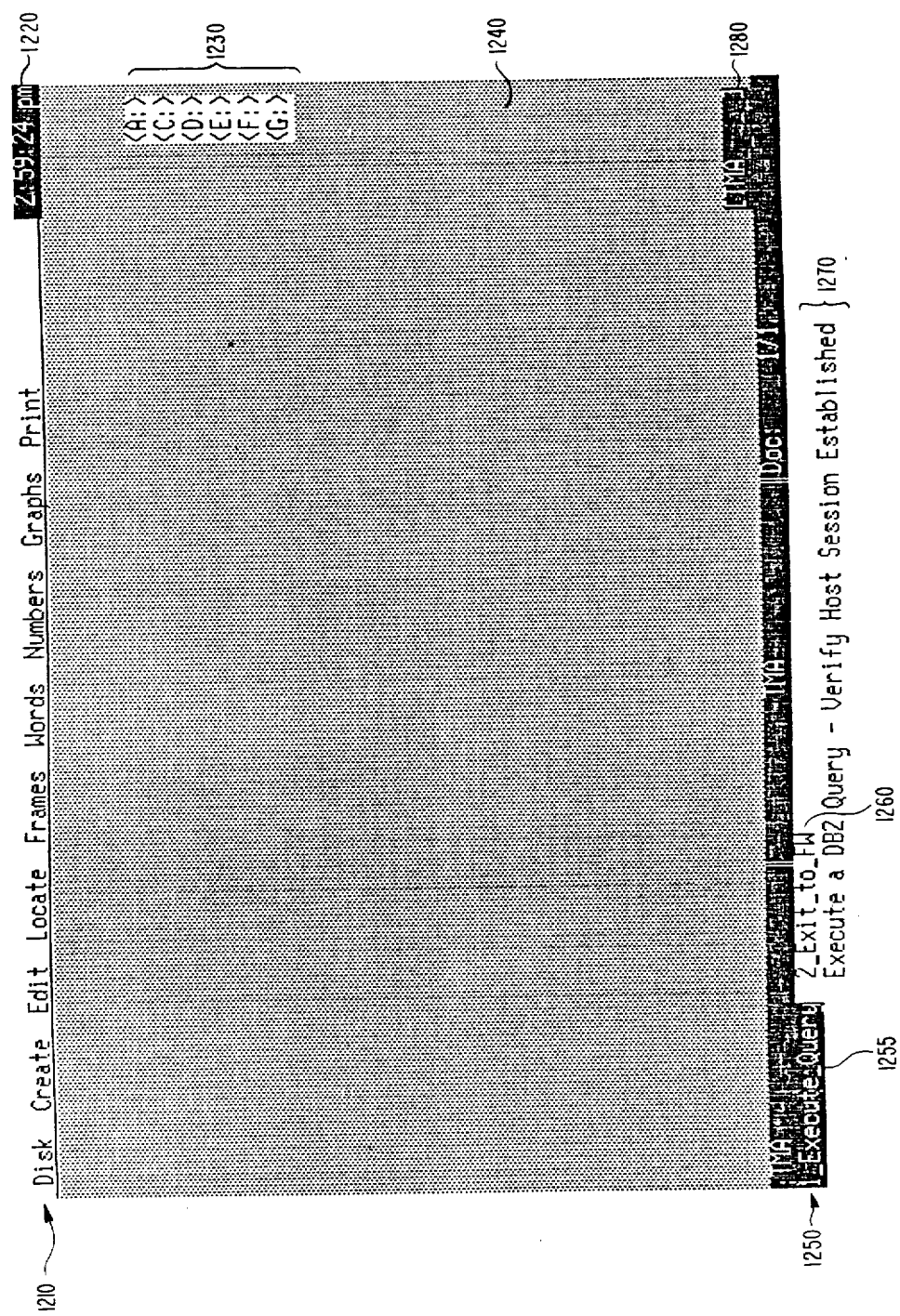
FIG. 12 shows a Query Request screen displayed by workstation 21.

FIGS. 12–13 depict actual workstation display screens showing the execution of a simple illustrative query for one specific illustrative embodiment.

After the workstation has been initialized and before a Query has been entered, the workstation display will resemble that shown in FIG. 12. Menu 1210 specifies the selectable functions provided by the "Framework" program. To the right of this menu lies time stamp 1220. Indicator 1230 lists the available disk drives, A:-G: of which drive A: is a conventional floppy disk drive, and drive C: is a Winchester type fixed disk drive, both of which are available at the workstation. Drives E:-G: are each 1 mega-byte "virtual" diskette drives available at the host. The "virtual" drives are accessed by the manager at the workstation in an identical manner as local disk drives. Region 1240 is the blank "Framework" desk top. TMA provides its own menu 1250 located at the bottom of the display screen; while "Framework" menu 1210 is situated at the top. TMA menu 1250 provides two selectable options: Execute Query option 1255 and Exit to Framework (FW) option 1260. The former option, when selected, invokes a host session for query execution. Alternatively, the latter option, when selected, provides the full functionality of the "Framework" environment for query formulation and analysis. Status message 1270 is provided, as ussed, to the manager to indicate the status of the host. Hierarchy indicator 1280 specifies the present level of TMA functionality. As shown, TMA is currently at its top level, i.e. level "TMA", awaiting for a choice to be made by the manager between either query execution or local "Framework" operations.

Now, FIG. 13 shows the result of executing a simple query for this embodiment. A DB2 SQL Query 1310 appears in the upper portion of the display. Here, the query, into the Maintenance Request database, requests all the number of outstanding or open MRs currently existing for each TIRKS system development organization grouped by ascending organization number. Results 1320 have been produced by this query. Each query into the relational database produces a corresponding result. Hence, multiple queries produce multiple results.

B. Analysis Display Screens

Figures 16, 16A:
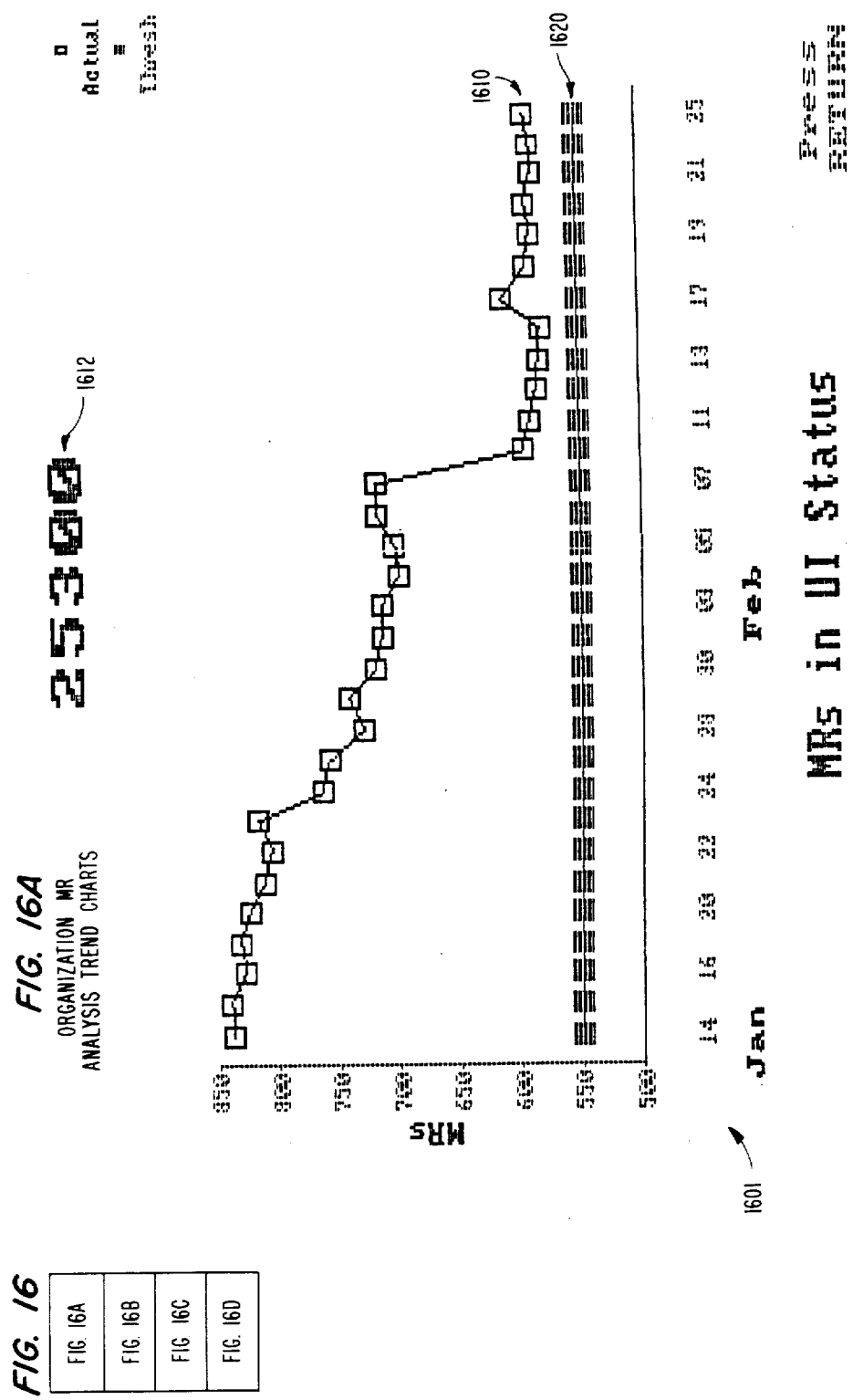
Figure 16B:
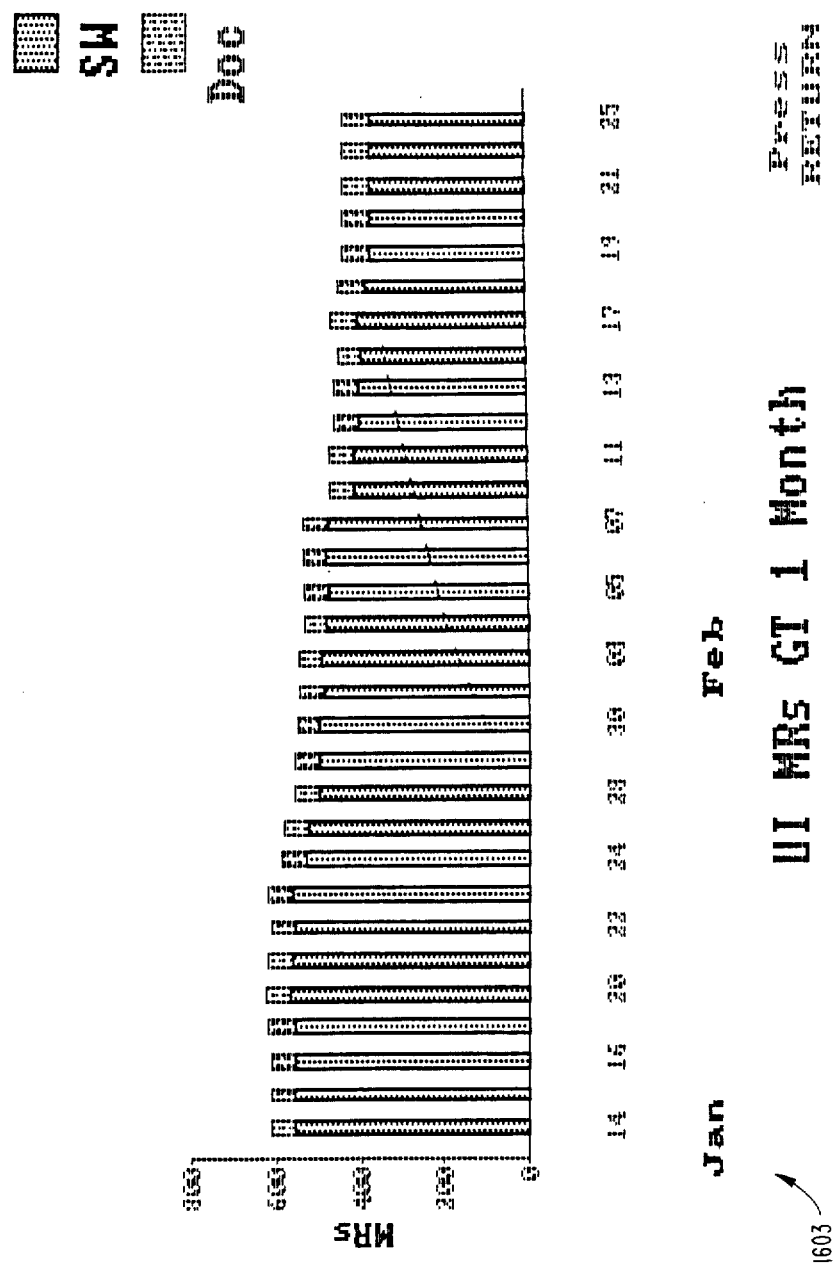
Figure 16C:
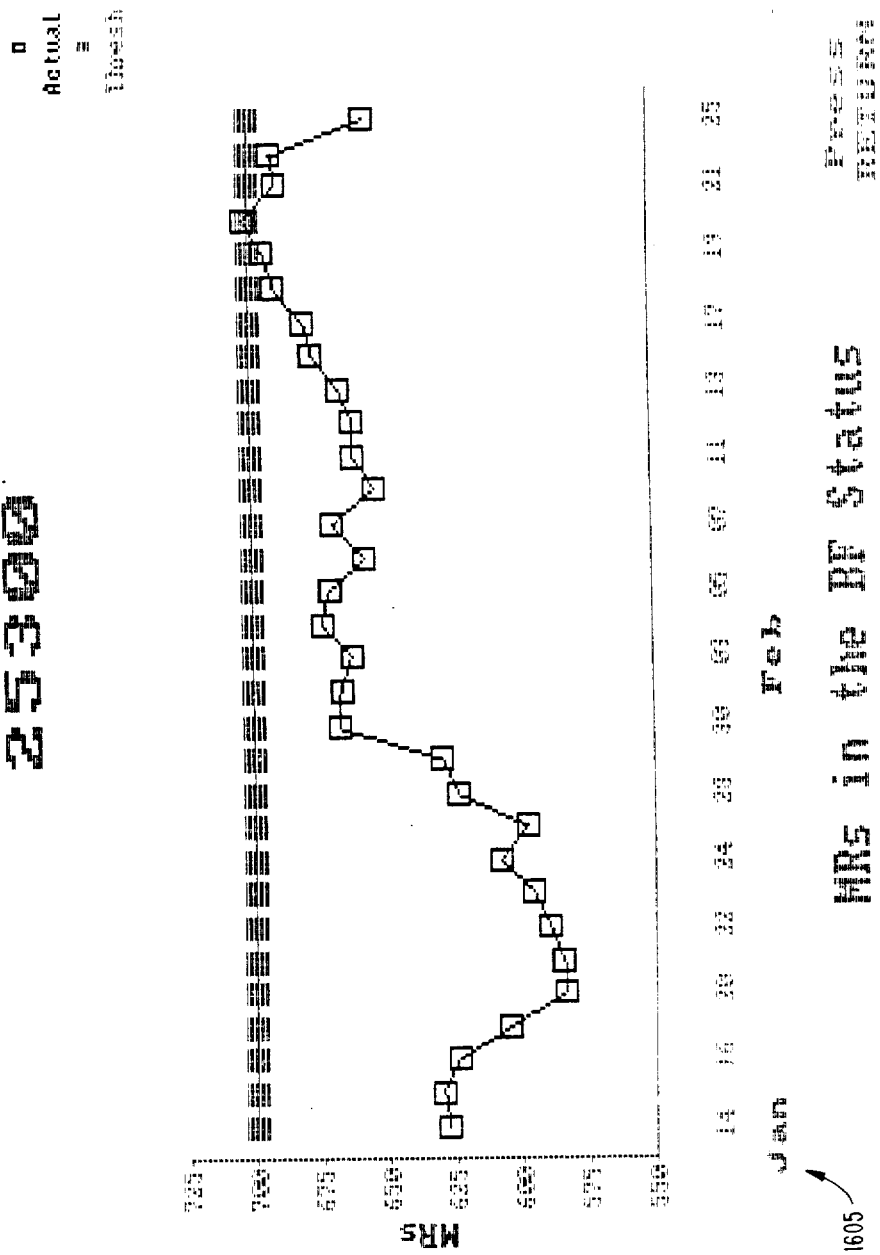
Figure 16D:
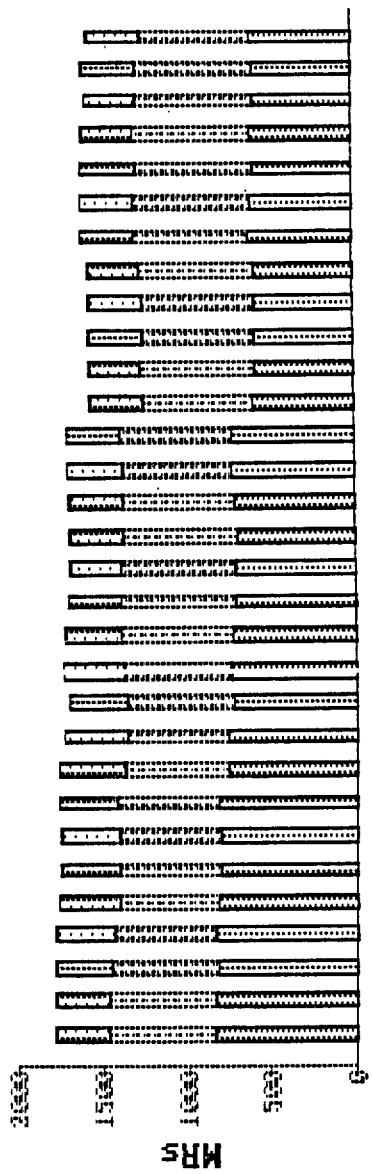

FIGS. 14–16 show actual display screens for an illustrative Organization MR analysis procedure occurring solely within the "Framework" environment at the workstation. The query results for these displays have already been downloaded from the host to the workstation and have been used to populate the lowest level bulletin boards—that shown in FIG. 15.

In particular, FIGS. 14a and 14b show high level analysis screens—the proper alignment of the drawing sheets for these figures is depicted in FIG. 14. As shown in FIG. 14a which depicts the highest level Analysis display screen, the four areas of analysis are presented in separate bulletin boards 1410: BOC, Organization (ORG), Subsystem (SUBSYS) and Release. Each bulletin board lists several categories of information each with a corresponding index, and each can be selected by the manager for further examination. MRs is one such category. As noted, the index is calculated as being a function of an actual value(s) accessed through the software metric table and a threshold value defined by a manager. If a development effort is proceeding properly, then the index value should ideally be zero. Date and time stamp 1418 indicates when ORG bulletin board 1415 was last calculated. A menu 1420 allows the manager to select any one of the four areas of analysis for further examination as well as thresholds. The thresholds function instructs the workstation to query the manager for new threshold values, as shown below, and then recalculate the locally stored data to generate a new set of indices and then repopulate the bulletin boards with new threshold values and re-calculated indices. In this case, the manager has selected the "ORG" option as indicated by the region of reversed video. Sub-menu 1430 lists the selectable functions available under the organization menu option: MR, TSC (technical support center), Staffing, Quality, Production (Prod), Budget, Recalculate and Execute. The Execute function instructs the workstation to obtain the most current data for a single area, here ORG data, from the host using pre-defined queries, in the manner described in detail above.

Now, once the "ORG" option within menu 1420 has been selected by the manager, the display screen changes, symbolized by arrow 1460, to the next lower analysis screen, i.e. Organization Analysis Screen 1405. Here, ORG bulletin board 1415 moves downward relative to the other bulletin boards to indicate that ORG Analysis is occurring. In addition, this lower level of Analysis is specified by the entry "[ORGanlys]" in hierarchy indicator 1280. At this point, sub-menu 1430 in screen 1401 has become the main menu for screen 1405. The manager can select any category in ORG Analysis by depressing a corresponding key in the main menu for screen 1405. For example, the manager can select MRs. A new sub-menu 1440 appears specifying the information for MRs that is available on the next lower screen, namely MR Statistics. These statistics provide data, as shown in FIG. 15a, on total MRs that are under investigation (UI), MRs that have been under investigation for more than 1 month, MRs that are being fixed and total open MRs. Screen 1405 shows a total index value for MRs of 86 for ORG Analysis. To investigate MRs further, the option "MRs" would be selected causing screen 1405 to change to screen 1501, as shown in FIG. 15a.

Now, within ORG Analysis, screen 1501, shown in FIG. 15a, shows the calculation of the index value for two main categories of MRs generated by ORG MR Analysis—as indicated by title 1510. As shown, there are 593 total MRs under investigation, and 657 MRs that are being fixed (BF). Here, the index is calculated as the total MR value for each of these categories less the corresponding threshold value. For example, the index for total MRs under investigation is 593 less 550, or 43; the index for MRs that are being fixed is calculated in an identical manner. The two indices 43 and 43 total to 86—the value given in the ORG bulletin board shown in FIGS. 14a and 14b. In addition, menu 1540 permits the manager to gain detailed information on other categories of MRs: the status of MRs that are under investigation, the number of MRs that have been under investigation for more than one month, the status of those MRs that are being fixed and the number of open MRs. In addition, menu 1540 allows the manager to gain access to the "TERMS" support system which maintains current statistics on MRs. The relational database, as discussed, receives current extracted statistics on MRs from this support system. Access to "TERMS" is provided by selecting "TERMS" option 1542 appearing within menu 1540. When selected, this option makes screen 1508 available in terminal emulation mode. Through this latter screen, the manager can utilize the full functionality provided by the TERMS support system.

Now, having stepped through the calculation of the indices at the lowest level ORG bulletin board, the manager can observe if a trend is occurring by instructing the "Framework" program to graph the software metric, here for any of the different categories of MRs for any given ORG, using both current and historical information. Such a selection is made by choosing an appropriate option in TMA menu 1540. The resulting trend and corresponding threshold values for each category of MRs available through menu 1540 in screen FIG. 15a is graphically depicted in FIGS. 16a-16d, for which the proper alignment of the drawing sheets is shown in FIG. 16. Segmented line 1610 shows the trend for the total MRs under investigation during the immediately preceding six week period. Line 1620 graphically indicates the corresponding threshold values, here a horizontal line at 550 MRs. Likewise, screens 1603, 1605 and 1608 respectively depict graphical trends for total MRs that have been under investigation for greater than one month, MRs that are being fixed and total open MRs. Simultaneous inclusion of graphical trend and threshold lines advantageously permits the manager to quickly assess whether development efforts are proceeding in a proper direction, e.g. whether the number of MRs under investigation is decreasing to an acceptable level. Designation 1612 refers to the number, here "25300", of a particular development organization responsible for handling these MRs. Pressing the "Return" key, as indicated, allows the manager to return to a previous screen, specifically screen 1501 appearing in FIG. 15a.

Figure 17:
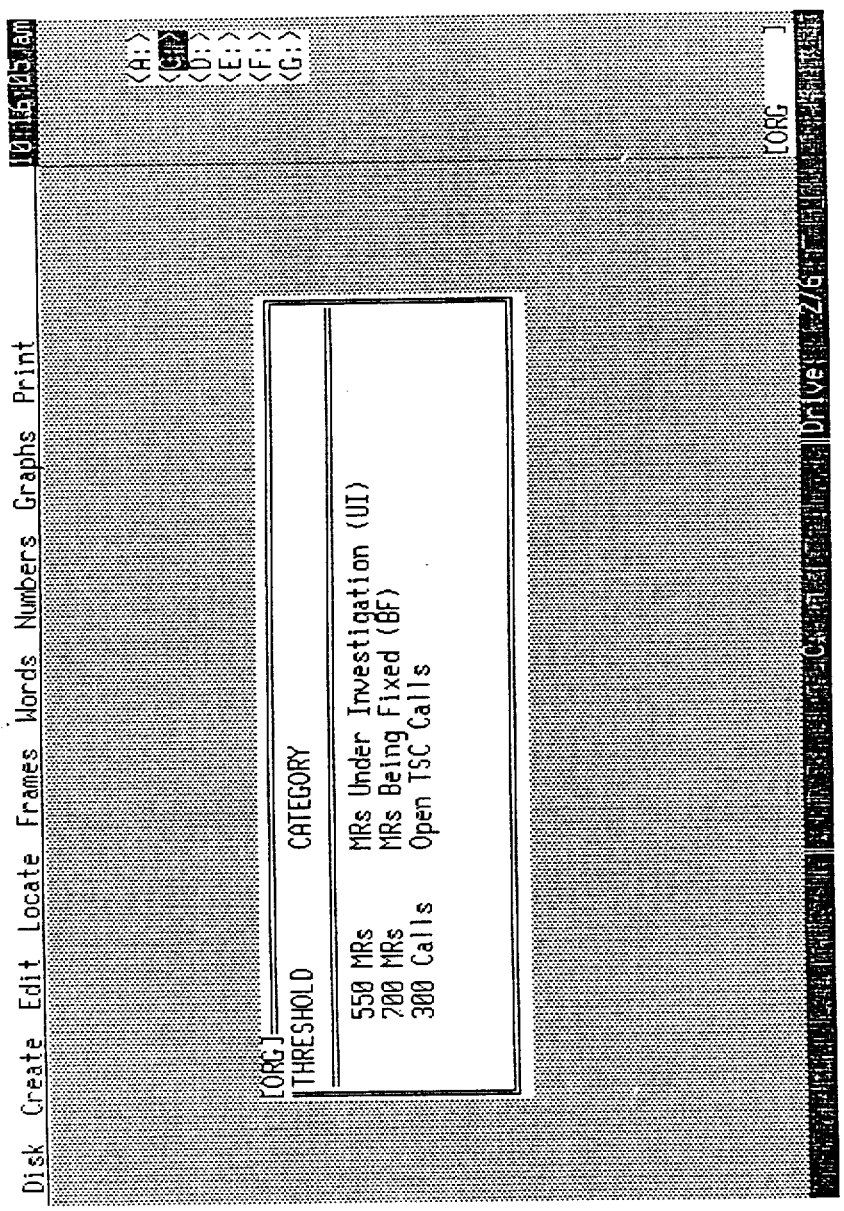
FIG. 17 depicts a typical threshold screen displayed by workstation 21 showing the MR thresholds used in Organization Analysis.

As noted, all threshold values used for each Analysis function are stored locally at the workstation. Each manager using TMA can utilize a different set of threshold values. To change a threshold value used in, for example, ORG Analysis, the manager selects the "Threshold" option appearing within main menu 1420 of screen 1401 shown in FIG. 14a. Once this option has been selected, the workstation displays screen 1701, shown in FIG. 17. This screen lists all the different threshold values, such as 550 for the total MRs under investigation. To change any threshold value, the manager moves a cursor (not shown) to highlight the desired threshold and types in a new value. Thereafter, the manager presses the "Return" key to save these threshold values for subsequent processing.

Organization, Subsystem and Release Analysis functions provide detailed status information for each TIRKS system development organization, subsystem and release, respectively. Each of these functions produces screens similar to those shown in FIGS. 13-17.

IX. Query Formulation

Pre-defined queries used in the inventive system are initially developed by first ascertaining the critical success factors relevant to each manager and then defining the specific information required by each factor, i.e. both the data required to be measured along with an accompanying threshold value. This definition occurs either through direct interviews with managers or through group meetings. Simultaneously, the manner in which the workstation will present the query results will also be pre-defined based upon the requirements of each manager. Once these queries, the threshold values, and the method of their presentation have all been pre-defined, this information is provided to each manager for local storage at his workstation. Over time, the needs of managers change. In response to this, a manager, using the "Framework" environment provided by the workstation, may change threshold values and/or compose totally new queries. If a new query (along with corresponding threshold values and manner of presentation) becomes widely used, this query (and its accompanying threshold and presentation information) may be integrated into the set of pre-defined queries and subsequently be made available to all managers. Thus, query formulation is an iterative process that adapts to the information needs of the management community.

Figure 18:
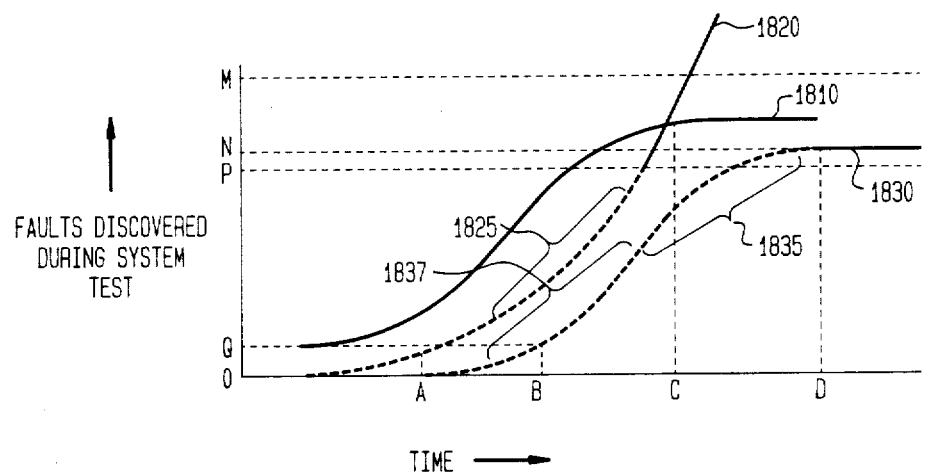
FIG. 18 graphically depicts an empirical correlation occurring between cumulative faults discovered during system test and time at which system testing is completed for a given TIRKS system release under development.

Once enough experience has been gained with specific queries and their results, an expert system can be incorporated into the inventive system to determine the next set of queries to execute given the results from a previous set and also to make predictions based upon the query results. In particular, a rule based expert system could be used to make inferences from a set of query results and select further queries based upon these inferences. For example, the cumulative number of faults discovered during system testing for any given release of the TIRKS system has been empirically found to correlate with system test completion (STC) time, in the manner depicted by curve 1810, shown in FIG. 18. As shown by this curve, the total number of faults increases over time and then flattens out. Completion time, point C for curve 1810, generally occurs when the curve flattens out, i.e. when the number of newly discovered faults becomes insignificant. A large number of such curves flatten out within the region bounded by cumulative fault values M and P. Consequently, since the characteristic shape of the cumulative fault-time curve is known a priori, analysis of the historical trend data for the cumulative number of faults encountered early on in the system testing phase will reveal the complete curve for that release of the TIRKS system. Once the actual curve is known, the system test completion time for that subsystem can be estimated. For example, assume that actual fault data for a given TIRKS system release under development produces a trend depicted by curve 1830. If current testing activities for that release presently lie within concave region 1835, then the curve can be projected to estimate time D as the completion time and value N, lying within region M-P, as the cumulative number of faults occurring at completion. Moreover, if the current cumulative number of faults is point Q located within convex region 1837 of curve 1830, specific queries can be automatically chosen by the expert system to gain further fault data to accurately determine the location of this curve and, since its shape is known a priori, accurately estimate the applicable completion date, here point D. Alternately, if the actual data produces a cumulative fault curve that resembles curve 1820, and current testing activities are situated within convex region 1825, further queries can be chosen by the expert system to confirm both the shape and location of curve 1820. Given the aberrant shape of curve 1820, the expert system would probably not be able to provide an estimate of the completion date but instead would recognize this aberrant condition and flag this release as having an abnormally high number of faults early in the testing process such that corrective action could be taken. For example, further conceptualization and development efforts on this release might be warranted at this time in order to uncover and correct the cause of these faults prior to preceding any further with system testing. Similar rule based inferences for use in choosing appropriate queries to execute can be drawn from empirical correlations occurring in historical data resulting from any stable set of queries.

Although a specific illustrative embodiment has been shown and described herein, this merely illustrates the principles of the present invention. Clearly, many other embodiments incorporating the teachings of the present invention may be readily constructed by those skilled in the art.

What is claimed is:

1. Apparatus for a management support system for providing desired information relating to a life cycle of a large scale software system, said apparatus comprising:
    at least one software support system for colecting information relating to a corresponding phase of the life cycle to provide collected information and for storing the collected information into at least one software support system database;
    a host computer for extracting pre-defined portions of the collected information sotred within said software support system database to provide extracted information and for updating a common database with the extracted information; and
    at least one computer based workstation connected, via a workstation/host communications interface, to said host computer for formulating a request message to said host computer for execution thereat in order to access the desired information from said common database;
    wherein said host computer comprises means, responsive to said request message, for initiating a host session for accessing the desired information from said common database and for transmitting to said workstation, via said interface, a response that includes the desired information; and wherein said workstation comprises means for storing the desired information contained in said response.

2. The apparatus in claim 1 wherein said workstation/host communications interface comprises means for connecting said workstation to said host computer in a substantially transparent manner to a user situated at said workstation.

3. The apparatus in claim 1 wherein said workstation comprises:
    means for locally formulating a query and for locally storing the query for subsequent inclusion into said request message;
    means for selectably transmitting said query, via said workstation/host communications interface to said host computer;
    means for locally analayzing, in a pre-defined manner, the desired information contained in said response from said host computer to provide analyzed data;

means for visually presenting said analyzed data in a user selectable format to generated selected data; and means, responsive to said presenting means, for displaying said selected data, and an indication corresponding to said query.

4. The apparatus in claim 3 wherein said host computer further comprises:

means, responsive to said request, for establishing a host database management session;

means, operative during said database management session, for executing said query into said common database and for providing a query result therefrom as said desired information;

means for generating a status message indicative of status of the query execution means; and means for including said status message and said query result into said response.

5. The apparatus in claim 4 wherein said workstation/host communicatioins interface further comprises:

means for allocating a pre-defined portion of memory residing at said host computer as at least one virtual diskette, said memory portion being accessible by a host database management program that manages said common database; and means for establishing appropriate interfaces at said host computer and said workstation to enable said workstation to access said virtual diskette on a read/write basis whereby said workstation can transfer said query to said host computer for execution thereat and receive the response therefrom.

6. The apparatus in claim 5 wherein said workstation further comprises means for comparing said query result against a pre-defined threshold value to obtain a difference and for providing an index value indicative of the difference therebetween.

7. The apparatus in claim 6 wherein said host computer further comprises:

means for periodically extracting said information portions from said software support system database to produce extracted information portions; and means, responsive to said extracted information portions, for updating a relational database to form said common database.

8. Apparatus for a management support system for providing desired information relating to a life cycle of a large scale software system, said apparatus comprising:

a plurality of workstations, wherein each of said workstations can be separately connected to a host computer, via a corresponding workstation/host communications interface, for establishing a substantially transparent corresponding host session, a plurality of software support systems, each executing in a corresponding computer and having a corresponding software support system database associated therewith, for collecting information relating to substantially all phases of the life cycle for said large scale software system to provide separately collected information and for storing the separately collected information into a corresponding said software support system database;

means for periodically extracting different predefined portions of the information stored within each said software support system database to provide extracted information portions, and for periodically updating a relational database resident on the host computer with said extracted information portions;

a plurality of virtual diskettes located at the host computer; and means for assigning at least a different corresponding one of said virtual diskettes to each corresponding one of said workstations in order to separately transfer a query from each of said workstations to said host computer and to separately transfer a corresponding response from said host computer to each of said workstations, each said response containing the desired information.

9. Apparatus for management support system for providing desired information relating to a life cycle of a large scale software system, said apparatus comprising:

at least one software support system for collecting information relating to a corresponding phase of the life cycle to provide collected information and for storing the collected information into at least one software support system database;

a host computer for extracting pre-defined portions of the information stored within said software support system database to provide extracted information and for updating a common database with said extracted information; and at least one computer based workstation connected, via a workstation/host communications interface, to said host computer, in a substantially transparent manner to a user situated at said workstation, for formulating a request to said host computer for execution thereat in order to access the desired information from said common database;

wherein said host computer comprises:

means, responsive to said request, for establishing a host database management session;

means, operative during said host database management session, for executing a query into said common database and for providing a query result therefrom as said desired information;

means for generating a status message indicative of status of the means for executing a query; and means for formualting said status message and said query result into a response; and wherein said workstation comprises:

means for locally formulating said query and for locally storing said query for subsequent inclusion into said request;

means for selectably transmitting said query, via said workstation/host communications interface, to said host computer and for locally storing the query result contained in said response as a locally stored query result;

means for locally analyzing, in a predefined manner, the locally stored query result to produce an analyzed query result;

means for visually presenting said analyzed query result in a user selectable format to generate selected data; and means, responsive to said presenting means, for displaying said selected data and an indication corresponding to said status message.

10. The apparatus in claim 9 wherein said workstation/host communications interface further comprises:

means for allocating a pre-defined portion of memory residing at said host computer as at least one virtual diskette, said memory portion being accessible by a host database management program that manages said common database; and means for establishing apropppriate interfaces at said host and said workstation to enable said workstation to access said virtual diskette on a read/write basis whereby said workstation can transfer said query to said host for execution thereat and receive the response therefrom.

11. The apparatus in claim 10 wherein said workstation further comprises means for comparing said query result against a pre-defined threshold value to obtain a difference and for providing an index value indicative of the difference therebetween.

12. The apparatus in claim 11 wherein said host computer further comprises:

means for periodically extracting said information portions from said software support system database to obtain extracted information portions; and means, responsive to said extracted information portions, for updating a relational database with said information portions to form said common database.

13. In a system comprising a host computer and at least one computer based workstation, a method for downloading to the workstation certain data accessible by the host computer, said method comprising the steps of:

formulating a request message at the workstation for execution by the host computer, said request message comprising a pre-defined sequence of host instruction and a query for selecting said certain data;

transmitting said request to the host computer via a workstation/host communications interface, said interface arranged to connect the workstation to the host computer in a substantially transparent fashion to a user situated at the workstation;

receiving said request message within the host computer and, in response to instructions, executable by the host computer, contained in the request message, initiating a database management session within the host computer to execute said query and access said certain data from host computer;

returning a response message to the workstation, said response message comprising said certain data; and detecting said response message within said workstation and, in response thereto, storing said certain data contained within said response message.

14. The method in claim 13 further comprising the steps of:

allocating a pre-defined portion of memory, utilized by said host computer, as at least one virtual diskette, said memory portion being accessible by a host database management program that manages a common database situated at the host; and establishing appropirate interfaces at said host computer and said workstation to enable said workstation to access said virtual diskette on a read/write basis whereby said workstation can transfer said query to said host computer for execution thereat and receive the response message therefrom.

15. The method in claim 14 further comprising the steps of:

periodically extracting current data from at least one database to produce extracted current data; and updating, in response to said extracted current data, the common database which contains the data accessible by the host computer.

* * * * *

UNITED STATES PATENT AND TRADEMARK OFFICE
CERTIFICATE OF CORRECTION

PATENT NO. : 4,751,635

DATED : June 14, 1988

INVENTOR(S) : Michael A. Kret

It is certified that error appears in the above-identified patent and that said Letters Patent is hereby corrected as shown below:

```
Column 26, line 28, change "colecting" to --collecting--;
Column 26, line 34, change "sotred" to --stored--;
Column 26, line 65, change "analayzing" to --analyzing--.
Column 27, line 21, change "communicatioins" to --communications--.
Column 29, line 3, change "aproppriate" to --appropriate--.
```

Signed and Sealed this

Fourth Day of August, 1992

Attest:

DOUGLAS B. COMER

*Attesting Officer*　　*Acting Commissioner of Patents and Trademarks*